US012328631B2

(12) United States Patent
Yang et al.

(10) Patent No.: US 12,328,631 B2
(45) Date of Patent: Jun. 10, 2025

(54) INTERFERENCE MITIGATION TECHNIQUES BETWEEN WIRELESS COMMUNICATIONS AND AIRCRAFT RADIO ALTIMETERS

(71) Applicant: QUALCOMM Incorporated, San Diego, CA (US)

(72) Inventors: Ming Yang, San Diego, CA (US); Kausik Ray Chaudhuri, San Diego, CA (US); Atanu Basudeb Halder, San Diego, CA (US); Marcelo Schiocchet, San Diego, CA (US); Neelakanta Venkata Seshachalam Chimmapudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 17/891,046

(22) Filed: Aug. 18, 2022

(65) Prior Publication Data

US 2024/0064596 A1 Feb. 22, 2024

(51) Int. Cl.
*H04W 36/30* (2009.01)
*H04B 7/185* (2006.01)
*H04W 76/30* (2018.01)

(52) U.S. Cl.
CPC ........ *H04W 36/30* (2013.01); *H04B 7/18506* (2013.01); *H04W 76/30* (2018.02)

(58) Field of Classification Search
CPC ................ H04W 36/30; H04W 76/30; H04W 36/00837; H04W 36/322; H04W 84/06; H04W 8/24; H04W 36/20; H04W 72/082; H04W 72/541; H04W 28/02; H04W 28/0236; H04B 7/18506; H04B 7/185;
(Continued)

(56) References Cited

U.S. PATENT DOCUMENTS

| 2013/0143502 A1* | 6/2013 | Kazmi | H04W 88/06 455/62 |
| 2013/0196650 A1* | 8/2013 | Futaki | H04W 24/10 455/424 |

(Continued)

FOREIGN PATENT DOCUMENTS

WO  WO-2024030605 A1 *  2/2024

*Primary Examiner* — Mohamed A Kamara
(74) *Attorney, Agent, or Firm* — Holland & Hart LLP

(57) ABSTRACT

This disclosure provides systems, methods and apparatus, including computer programs encoded on computer storage media, for interference mitigation techniques between wireless communications and aircraft radio altimeters. In some aspects, a user equipment (UE) and a network entity may support one or more signaling- or configuration-based interference avoidance mechanisms associated with usage of a C-band at one or both of the UE and the network entity. The UE may support a capability according to which the UE is able to monitor a frequency band used by aircraft radio altimeters and the UE may request a modification to a C-band connection (such as request a release of the C-band connection) if the UE detects or measures signaling from an aircraft radio altimeter. Similarly, the network entity may modify the C-band connection if the network entity receives the request from the UE or itself detects or measures signaling from an aircraft radio altimeter.

27 Claims, 8 Drawing Sheets

(58) Field of Classification Search
CPC ........ H04B 7/0857; H04B 7/155; H04B 7/26; H04B 7/204; H04L 5/0073
See application file for complete search history.

(56) References Cited

U.S. PATENT DOCUMENTS

| | | | | |
|---|---|---|---|---|
| 2016/0014779 | A1* | 1/2016 | Hu | H04W 72/27 370/252 |
| 2016/0050676 | A1* | 2/2016 | Sinnaduray | H04L 5/00 370/329 |
| 2016/0345339 | A1* | 11/2016 | Hori | H04W 48/20 |
| 2023/0362746 | A1* | 11/2023 | Vivanco | H04B 17/27 |

* cited by examiner

INTERFERENCE MITIGATION TECHNIQUES BETWEEN WIRELESS COMMUNICATIONS AND AIRCRAFT RADIO ALTIMETERS

TECHNICAL FIELD

This disclosure relates to wireless communications, including interference mitigation techniques between wireless communications and aircraft radio altimeters.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-s-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include transmitting, to a network entity, a UE capability indication associated with aircraft radio altimetry at a first frequency band and transmitting, to the network entity, a request for a modification to a radio frequency connection between the UE and the network entity, where the request for the modification is associated with the aircraft radio altimetry at the first frequency band, and where the radio frequency connection is associated with a second frequency band allocated for communications between the UE and the network entity.

Another innovative aspect of the subject matter described in this disclosure can be implemented in an apparatus for wireless communications at a UE. The apparatus may include one or more interfaces and a processing system. The one or more interfaces may be configured to output, to a network entity, a UE capability indication associated with aircraft radio altimetry at a first frequency band and output, to the network entity, a request for a modification to a radio frequency connection between the UE and the network entity, where the request for the modification is associated with the aircraft radio altimetry at the first frequency band, and where the radio frequency connection is associated with a second frequency band allocated for communications between the UE and the network entity.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to transmit, to a network entity, a UE capability indication associated with aircraft radio altimetry at a first frequency band and transmit, to the network entity, a request for a modification to a radio frequency connection between the UE and the network entity, where the request for the modification is associated with the aircraft radio altimetry at the first frequency band, and where the radio frequency connection is associated with a second frequency band allocated for communications between the UE and the network entity.

Another innovative aspect of the subject matter described in this disclosure can be implemented in another apparatus for wireless communications at a UE. The apparatus may include means for transmitting, to a network entity, a UE capability indication associated with aircraft radio altimetry at a first frequency band and means for transmitting, to the network entity, a request for a modification to a radio frequency connection between the UE and the network entity, where the request for the modification is associated with the aircraft radio altimetry at the first frequency band, and where the radio frequency connection is associated with a second frequency band allocated for communications between the UE and the network entity.

Another innovative aspect of the subject matter described in this disclosure can be implemented in a non-transitory computer-readable medium storing code for wireless communications at a UE. The code may include instructions executable by a processor to transmit, to a network entity, a UE capability indication associated with aircraft radio altimetry at a first frequency band and transmit, to the network entity, a request for a modification to a radio frequency connection between the UE and the network entity, where the request for the modification is associated with the aircraft radio altimetry at the first frequency band, and where the radio frequency connection is associated with a second frequency band allocated for communications between the UE and the network entity.

Some implementations of the method, apparatuses, and non-transitory computer-readable medium described herein may further include operations, features, means, or instructions for monitoring the first frequency band for signaling associated with an aircraft radio altimeter in accordance with the UE capability indication and in accordance with a triggering condition at the UE.

One innovative aspect of the subject matter described in this disclosure can be implemented in a method for wireless communications at a network entity. The method may include monitoring a first frequency band associated with aircraft radio altimeters in accordance with a geographic location of the network entity being within a geographic area associated with potential interference between the network entity and the aircraft radio altimeters and transmitting, to a UE, an indication of a modification to a radio frequency connection between the UE and the network entity in accordance with monitoring the first frequency band associated with the aircraft radio altimeters, where the radio frequency connection is associated with a second frequency band allocated for communications between the UE and the network entity.

Another innovative aspect of the subject matter described in this disclosure can be implemented in an apparatus for wireless communications at a network entity. The apparatus may include one or more interfaces and a processing system. The processing system may be configured to monitor a first frequency band associated with aircraft radio altimeters in accordance with a geographic location of the network entity being within a geographic area associated with potential interference between the network entity and the aircraft radio altimeters. The one or more interfaces may be configured to output, to a UE, an indication of a modification to a radio frequency connection between the UE and the network entity in accordance with monitoring the first frequency band associated with the aircraft radio altimeters, where the radio frequency connection is associated with a second frequency band allocated for communications between the UE and the network entity.

Another innovative aspect of the subject matter described in this disclosure can be implemented in an apparatus for wireless communications at a network entity. The apparatus may include a processor, memory coupled with the processor, and instructions stored in the memory. The instructions may be executable by the processor to cause the apparatus to monitor a first frequency band associated with aircraft radio altimeters in accordance with a geographic location of the network entity being within a geographic area associated with potential interference between the network entity and the aircraft radio altimeters and transmit, to a UE, an indication of a modification to a radio frequency connection between the UE and the network entity in accordance with monitoring the first frequency band associated with the aircraft radio altimeters, where the radio frequency connection is associated with a second frequency band allocated for communications between the UE and the network entity.

Another innovative aspect of the subject matter described in this disclosure can be implemented in another apparatus for wireless communications at a network entity. The apparatus may include means for monitoring a first frequency band associated with aircraft radio altimeters in accordance with a geographic location of the network entity being within a geographic area associated with potential interference between the network entity and the aircraft radio altimeters and means for transmitting, to a UE, an indication of a modification to a radio frequency connection between the UE and the network entity in accordance with monitoring the first frequency band associated with the aircraft radio altimeters, where the radio frequency connection is associated with a second frequency band allocated for communications between the UE and the network entity.

Another innovative aspect of the subject matter described in this disclosure can be implemented in a non-transitory computer-readable medium storing code for wireless communications at a network entity. The code may include instructions executable by a processor to monitor a first frequency band associated with aircraft radio altimeters in accordance with a geographic location of the network entity being within a geographic area associated with potential interference between the network entity and the aircraft radio altimeters and transmit, to a UE, an indication of a modification to a radio frequency connection between the UE and the network entity in accordance with monitoring the first frequency band associated with the aircraft radio altimeters, where the radio frequency connection is associated with a second frequency band allocated for communications between the UE and the network entity.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
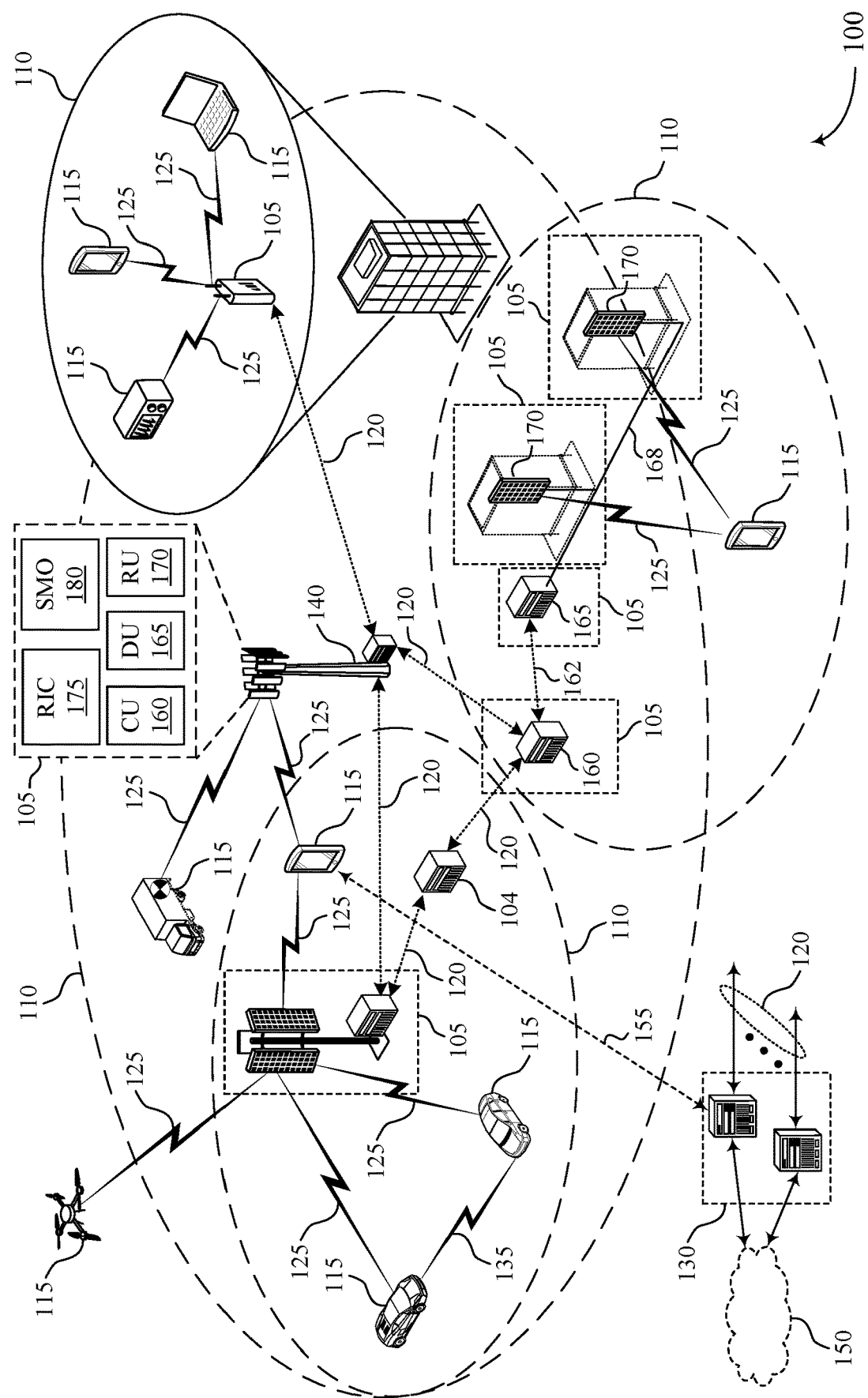
FIG. 1 shows an example wireless communications system that supports interference mitigation techniques between wireless communications and aircraft radio altimeters.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing third generation (3G), fourth generation (4G), fifth generation (5G), or sixth generation (6G), or further implementations thereof, technology.

As wireless communications deployments (such as 5G deployments) are adopted by more networks and as more devices communicate via over-the-air (OTA) signaling, some wireless communications systems may extend wireless communications into additional frequency bands to provide more resources via which devices may transmit or receive OTA signaling. Extending into some frequency bands may adversely impact other, higher priority wireless signaling. For example, as 5G communications extends into a C-band radio frequency band, there is a potential concern that wireless communications sent using the C-band might interfere with radio altimeters used by aircraft. For example, the C-band (which may span a frequency range from approximately 3700 megahertz (MHz) to approximately 3980 MHz) may be relatively close in frequency to a frequency band used by aircraft radio altimeters (which may span a frequency range from approximately 4200 to approximately 4400 MHz) and wireless transmissions sent using the C-band may interfere with radio altimeter radar signaling. Further, although there may be a frequency guard band between the C-band and the aircraft radio altimeter band (such as an approximately 220 MHz guard band), in some instances, a receiver front-end filter response of an aircraft radio altimeter may be relatively poorly tuned and nonetheless pick up signaling sent using the C-band. Such interference may adversely impact an ability of an aircraft to accurately measure an altitude of the aircraft, which may have repercussions in terms of aircraft safety and piloting difficulties.

In some implementations, a user equipment (UE) and a network entity may support one or more signaling- or configuration-based interference avoidance mechanisms associated with a usage of the C-band at one or both of the UE and the network entity. For example, the UE may support a capability according to which the UE is able to monitor a frequency band used by aircraft radio altimeters and the UE may request a modification to a C-band connection (such as request a release of the C-band connection) between the UE and the network entity if the UE detects or measures signaling from an aircraft radio altimeter. In some implementations, the UE may monitor the frequency band used by aircraft radio altimeters in scenarios in which it is relatively more likely that transmissions to or from the UE using the C-band may interfere with aircraft radio altimeters and may otherwise refrain from monitoring the frequency band used by aircraft radio altimeters. For example, the UE may monitor the frequency band used by aircraft radio altimeters if requested by the network entity, in accordance with a location-associated algorithm or application at the UE, or in accordance with establishing a connection to an airport wireless fidelity (Wi-Fi) network. Additionally, or alternatively, the network entity may monitor the frequency band used by aircraft radio altimeters. If the network entity detects signaling from an aircraft radio altimeter, the network entity may release one or more C-band connections, update one or more parameters associated with C-band access (such as cell selection parameters, cell reselection parameters, or handover parameters), or modify in which spatial directions the network entity performs transmissions using the C-band.

Particular implementations of the subject matter described in this disclosure can be implemented to realize one or more of the following potential advantages. For example, in accordance with implementing interference avoidance mechanisms associated with a usage of the C-band at one or both of the UE and the network entity, the UE and the network entity may use the C-band when transmissions via the C-band are unlikely to cause interference to an aircraft radio altimeter and may avoid using the C-band when transmissions via the C-band would likely cause interference to an aircraft radio altimeter. As such, the UE and the network entity may balance greater system capacity, higher data rates, and greater frequency diversity provided by C-band communications with safe operation of aircrafts. In other words, the UE and the network entity may experience higher reliability while supporting more seamless coexistence between wireless communications (such as 5G and 6G communications) and aircraft radio altimeters operating at adjacent or nearby bands. Further, the described techniques may provide mobility enhancements for the UE, as the UE may selectively and intelligently monitor the frequency band used by aircraft radio altimeters depending on an actual, predicted, or expected location of the UE. Further, as a result of such selective and intelligent monitoring (which may be associated or in accordance with one or more of an artificial intelligence (AI) algorithm, a machine learning (ML) algorithm, and historical data), the UE may achieve greater power savings and experience longer battery life, among other benefits.

FIG. 1 shows an example wireless communications system 100 that supports interference mitigation techniques between wireless communications and aircraft radio altimeters. The wireless communications system 100 may include one or more network entities 105, one or more UEs 115, and a core network 130. In some implementations, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some implementations, network entities 105 and UEs 115 may wirelessly communicate via one or more communication links 125 (such as a radio frequency (RF) access link). For example, a network entity 105 may support a coverage area 110 (such as a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (such as any network entity described herein), a UE 115 (such as any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some implementations, network entities 105 may communicate with the core network 130, or with one another, or both. For example, network entities 105 may communicate with the core network 130 via one or more backhaul communication links 120 (such as in accordance with an S1, N2, N3, or other interface protocol). In some implementations, network entities 105 may communicate with one another via a backhaul communication link 120 (such as in accordance with an X2, Xn, or other interface protocol) either directly (such as directly between network entities 105) or indirectly (such as via a core network 130). In some implementations, network entities 105 may communicate with one another via a midhaul communication link 162 (such as in accordance with a midhaul interface protocol) or a fronthaul communication link 168 (such as in accordance with a fronthaul interface protocol), or any combination thereof. The backhaul communication links 120, midhaul communication links 162, or fronthaul communication links 168 may be or include one or more wired links (such as an electrical link, an optical fiber link), one or more wireless links (such as a radio link, a wireless optical link), among other examples or various combinations thereof. A UE 115 may communicate with the core network 130 via a communication link 155.

One or more of the network entities 105 described herein may include or may be referred to as a base station (BS) 140 (such as a base transceiver station, a radio BS, an NR BS, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some implementations, a network entity 105 (such as a BS 140) may be implemented in an aggregated (such as monolithic, standalone) BS architecture, which may be configured to utilize a protocol stack that is physically or logically integrated within a single network entity 105 (such as a single RAN node, such as a BS 140).

In some implementations, a network entity 105 may be implemented in a disaggregated architecture (such as a disaggregated BS architecture, a disaggregated RAN architecture), which may be configured to utilize a protocol stack that is physically or logically distributed among two or more network entities 105, such as an integrated access backhaul (IAB) network, an open RAN (O-RAN) (such as a network configuration sponsored by the O-RAN Alliance), or a virtualized RAN (vRAN) (such as a cloud RAN (C-RAN)). For example, a network entity 105 may include one or more of a central unit (CU) 160, a distributed unit (DU) 165, a radio unit (RU) 170, a RAN Intelligent Controller (RIC) 175 (such as a Near-Real Time RIC (Near-RT RIC), a Non-Real Time RIC (Non-RT RIC)), a Service Management and Orchestration (SMO) 180 system, or any combination thereof An RU 170 also may be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (such as separate physical locations). In some implementations, one or more network entities 105 of a disaggregated RAN architecture may be implemented as virtual units (such as a virtual CU (VCU), a virtual DU (VDU), a virtual RU (VRU)).

The split of functionality between a CU 160, a DU 165, and an RU 170 is flexible and may support different functionalities depending on which functions (such as network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some implementations, the CU 160 may host upper protocol layer (such as layer 3 (L3), layer 2 (L2)) functionality and signaling (such as Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (such as physical (PHY) layer) or L2 (such as radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (such as via one or more RUs 170). In some implementations, a functional split between a CU 160 and a DU 165, or between a DU 165 and an RU 170 may be within a protocol layer (such as some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (such as F1, F1-c, F1-u), and a DU 165 may be connected to one or more RUs 170 via a fronthaul communication link 168 (such as open fronthaul (FH) interface). In some implementations, a midhaul communication link 162 or a fronthaul communication link 168 may be implemented in accordance with an interface (such as a channel) between layers of a protocol stack supported by respective network entities 105 that are in communication via such communication links.

In wireless communications systems (such as wireless communications system 100), infrastructure and spectral resources for radio access may support wireless backhaul link capabilities to supplement wired backhaul connections, providing an IAB network architecture (such as to a core network 130). In some implementations, in an IAB network, one or more network entities 105 (such as IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (such as a donor BS 140). The one or more donor network entities 105 (such as IAB donors) may be in communication with one or more additional network entities 105 (such as IAB nodes 104) via supported access and backhaul links (such as backhaul communication links 120). IAB nodes 104 may include an IAB mobile termination (IAB-MT) controlled (such as scheduled) by DUs 165 of a coupled IAB donor. An IAB-MT may include an independent set of antennas for relay of communications with UEs 115, or may share the same antennas (such as of an RU 170) of an IAB node 104 used for access via the DU 165 of the IAB node 104 (such as referred to as virtual IAB-MT (vIAB-MT)). In some implementations, the IAB nodes 104 may include DUs 165 that support communication links with additional entities (such as IAB nodes 104, UEs 115) within the relay chain or configuration of the access network (such as downstream). In such implementations, one or more components of the disaggregated RAN architecture (such as one or more IAB nodes 104 or components of IAB nodes 104) may be configured to operate according to the techniques described herein.

In the implementation of the techniques described herein applied in the context of a disaggregated RAN architecture, one or more components of the disaggregated RAN architecture may be configured to support interference mitigation techniques between wireless communications and aircraft radio altimeters as described herein. For example, some operations described as being performed by a UE 115 or a network entity 105 (such as a BS 140) may additionally, or alternatively, be performed by one or more components of the disaggregated RAN architecture (such as IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. As described herein, a UE 115 may be an example of a cellular phone, a personal digital assistant (PDA), a smart phone, a multimedia/entertainment device (such as a radio or a video device), a camera, a gaming device, a navigation or positioning device (such as global navigation satellite system (GNSS) devices), a tablet computer, a laptop computer, a netbook, a smartbook, a personal computer, a smart device, a wearable device (such as a smart watch, smart clothing, smart glasses, virtual reality goggles, a smart wristband, smart jewelry (such as a smart ring or a smart bracelet)), a drone, a robot/robotic device, a vehicle, a vehicular device, a meter, a monitor, a gas pump, an appliance (such as a kitchen appliance, a washing machine, or a dryer), a location tag, a medical/healthcare device, an implant, a sensor/actuator (S/A), a display, or any other suitable device configured to communicate via a wireless medium.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay BSs, among other examples, as shown in FIG. 1.

The UEs 115 and the network entities 105 may wirelessly communicate with one another via one or more communication links 125 (such as an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (such as entity, sub-entity) of a network entity 105. For example, the terms "transmitting," "receiving," or "communicating," when referring to a network entity 105, may refer to any portion of a network entity 105 (such as a BS 140, a CU 160, a DU 165, a RU 170) of a RAN communicating with another device (such as directly or via one or more other network entities 105).

Signal waveforms transmitted via a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (such as a duration of one modulation symbol) and one subcarrier, for which the symbol period and subcarrier spacing may be inversely related. The quantity of bits carried by each resource element may depend on the modulation scheme (such as the order of the modulation scheme, the coding rate of the modulation scheme, or both), such that a relatively higher quantity of resource elements (such as in a transmission duration) and a relatively higher order of a modulation scheme may correspond to a relatively higher rate of communication. A wireless communications resource may refer to a combination of an RF spectrum resource, a time resource, and a spatial resource (such as a spatial layer, a beam), and the use of multiple spatial resources may increase the data rate or data integrity for communications with a UE 115.

The time intervals for the network entities 105 or the UEs 115 may be expressed in multiples of a basic time unit which may, in some implementations, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a quantity of slots. Alternatively, each frame may include a variable quantity of slots, and the quantity of slots may depend on subcarrier spacing. Each slot may include a quantity of symbol periods (such as depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (such as N f) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as a quantity of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a set of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a network entity 105 (such as a BS 140, an RU 170) may be movable and therefore provide communication coverage for a moving coverage area 110. In some implementations, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data.

Support for ultra-reliable, low-latency functions may include prioritization of services, and such services may be used for public safety or general commercial applications. The terms ultra-reliable, low-latency, and ultra-reliable low-latency may be used interchangeably herein.

In some implementations, a UE 115 may be configured to support communicating directly with other UEs 115 via a device-to-device (D2D) communication link 135 (such as in accordance with a peer-to-peer (P2P), D2D, or sidelink protocol). In some implementations, one or more UEs 115 of a group that are performing D2D communications may be within the coverage area 110 of a network entity 105 (such as a BS 140, an RU 170), which may support aspects of such D2D communications being configured by (such as scheduled by) the network entity 105. In some implementations, one or more UEs 115 of such a group may be outside the coverage area 110 of a network entity 105 or may be otherwise unable to or not configured to receive transmissions from a network entity 105. In some implementations, groups of the UEs 115 communicating via D2D communications may support a one-to-many (1:M) system in which each UE 115 transmits to each of the other UEs 115 in the group. In some implementations, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (such as BSs 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 MHz to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communication using UHF waves may be associated with smaller antennas and shorter ranges (such as less than 100 kilometers) compared to communications using the smaller frequencies and longer waves of the high frequency (HF) or very high frequency (VHF) portion of the spectrum below 300 MHz.

The wireless communications system 100 also may operate using a super high frequency (SHF) region, which may be in the range of 3 GHz to 30 GHz, also known as the centimeter band, or using an extremely high frequency (EHF) region of the spectrum (such as from 30 GHz to 300 GHz), also known as the millimeter band. In some implementations, the wireless communications system 100 may support millimeter wave (mmW) communications between the UEs 115 and the network entities 105 (such as BSs 140, RUs 170), and EHF antennas of the respective devices may be smaller and more closely spaced than UHF antennas. In some implementations, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some implementations, operations using unlicensed bands may be based on a carrier aggregation configuration in conjunction with component carriers operating using a licensed band (such as LAA). Operations using unlicensed spectrum may include downlink transmissions, uplink transmissions, P2P transmissions, or D2D transmissions, among other examples.

A network entity 105 (such as a BS 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which also may be referred to as spatial filtering, directional transmission, or directional reception, is a signal processing technique that may be used at a transmitting device or a receiving device (such as a network entity 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

In some wireless communications systems, such as the wireless communications system 100, one or more UEs 115 or one or more network entities 105, or any combination thereof, may support one or more signaling- or configuration-based interference avoidance mechanisms. As part of an interference avoidance mechanism, one or more UEs 115 or one or more network entities 105, or any combination thereof, may monitor a frequency band used by higher priority signaling (such as signaling to which the one or more UEs 115 or the one or more network entities 105 attempt to avoid causing interference) and may modify a connection or any one or more parameters associated with a connection if the higher priority signaling is detected or measured. In some aspects, a modification of a connection may include enabling or disabling a use of the connection for wireless communications. Further, a modification to any one or more parameters associated with a connection may include modifying (such as changing or suspending) one or more cell selection parameters, one or more cell reselection parameters, one or more handover parameters, or one or more spatial parameters associated with the connection, or any combination thereof. Further, as described herein, a connection may be equivalently referred to as a radio frequency connection, a link, a radio frequency link, or a wireless communications link and may generally refer to any wireless connection between two devices.

In some deployments, the wireless communications system 100 may allow, enable, or otherwise facilitate communications using a C-band radio frequency band and, in some implementations, one or more UEs 115 or one or more network entities 105 may employ an interference avoidance mechanism according to which the one or more UEs 115 or the one or more network entities 105 attempt to avoid causing interference to signaling in neighboring frequency bands, such as signaling from an aircraft radio altimeter. For example, the C-band may span a frequency range from approximately 3700 MHz to approximately 3980 MHz and a frequency band used by aircraft radio altimeters may span a frequency range from approximately 4200 to approximately 4400 MHz and wireless transmissions sent using the C-band may potentially interfere with radio altimeter radar signaling. Further, although there may be a frequency guard band between the C-band and the aircraft radio altimeter band (such as an approximately 220 MHz guard band), a receiver front-end filter response of an aircraft radio altimeter may be relatively poor and nonetheless pick up signaling sent using the C-band.

In accordance with an interference avoidance mechanism, the one or more UEs 115 or the one or more network entities 105 may monitor the frequency band used by aircraft radio altimeters and may modify or suspend (in part or entirely) communication via the C-band if signaling from an aircraft radio altimeter is detected. A detection of signaling from an aircraft radio altimeter may include identifying, ascertaining, or determining that signaling from an aircraft radio altimeter is present (or is likely present) in one or more of various manners. In some implementations, a UE 115 or a network entity 105 may detect that signaling from an aircraft radio altimeter is present as a result of measuring that an energy level of the frequency band used by aircraft radio altimeters satisfies (such as is greater than or equal to) a threshold energy level.

Additionally, or alternatively, a UE 115 or a network entity 105 may detect that signaling from an aircraft radio altimeter is present or likely present as a result of identifying, expecting, or ascertaining a presence or a likely presence of an aircraft. For example, a UE 115 or a network entity 105 may identify, expect, or ascertain a presence or a likely presence of an aircraft as a result of receiving an explicit indication of the presence or likely presence (such as from another UE 115 or network entity 105, or from an aircraft itself) or identifying, measuring, or determining (such as via an implicit or explicit indication) that the UE 115 or the network entity 105 is in a vicinity of an airport or in a vicinity of another area within which aircraft altimetry is critical (such as within a threshold distance from an airport or other altimetry-critical area, or within a geographic region associated with an airport or other altimetry-critical area). Such an altimetry-critical area may be static (such as a mountainous area or another area within which aircraft frequently fly low to the ground, such as a training area) or dynamic (such as an area experiencing a forest fire, where an aircraft may fly low to the ground to drop fire-extinguishing material). In some aspects, detecting that an aircraft is present or likely present may trigger a modification to a C-band connection. In some other aspects, detecting that an aircraft is present or likely present may trigger a monitoring of the frequency band used by aircraft radio altimeters (where an actual detection or measurement of a threshold amount of energy on the frequency band used by aircraft radio altimeters may trigger the modification to the C-band connection).

Figure 2:
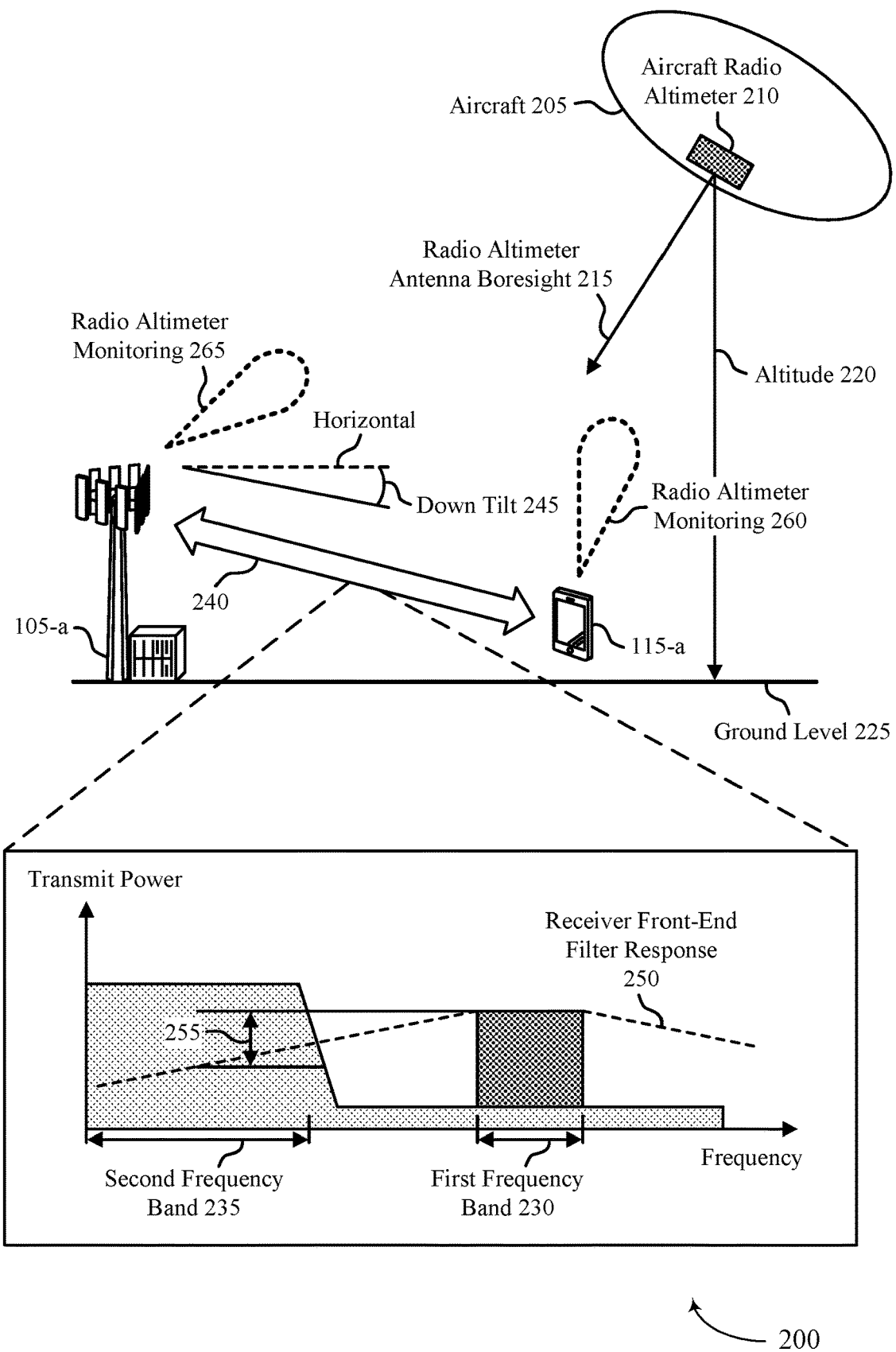
FIG. 2 shows an example signaling diagram that supports interference mitigation techniques between wireless communications and aircraft radio altimeters.

FIG. 2 shows an example signaling diagram 200 that supports interference mitigation techniques between wireless communications and aircraft radio altimeters. The signaling diagram 200 may implement or be implemented to realize or supplement aspects of the wireless communications system 100. For example, the signaling diagram 200 illustrates communication between a UE 115-a and a network entity 105-a. The UE 115-a may be an example of a UE 115 as illustrated by and described with reference to FIG. 1. The network entity 105-a may be an example of a network entity 105 as illustrated by and described with reference to FIG. 1. In some implementations, the UE 115-a and the network entity 105-a may support one or more signaling- or configuration-based interference avoidance mechanisms associated with a usage of a C-band for wireless communications to avoid interfering with higher priority signaling, such as signaling from an aircraft radio altimeter 210 of an aircraft 205.

For example, the aircraft 205 may use the aircraft radio altimeter 210, which may be associated with a radio altimeter antenna boresight 215, to measure an altitude 220 of the aircraft 205 above ground level 225. For example, the aircraft radio altimeter 210 may measure the altitude 220 above a terrain (such as above the ground level 225 by timing how long it takes a beam of radio waves to travel to the ground level 225, reflect off the ground level 225, and return to the aircraft 205 (such as to the aircraft radio altimeter 210). The aircraft radio altimeter 210 may be equivalently referred to as a radar altimeter, a radio altimeter (RALT), an electronic altimeter, a reflection altimeter, or a low-range radio altimeter (LRRA). The aircraft 205 use the altitude 220 to perform various in-flight controls or to provide in-flight information to a pilot, which may be especially useful in scenarios in which the aircraft 205 is relatively close to the ground level 225 (such as during landing, take-off, or other low-altitude flying scenarios).

Aircraft radio altimeters 210 may use a first frequency band 230 to transmit and receive the beams of radio waves for altitude measurement. The first frequency band 230 may span a frequency range between approximately 4200 MHz and approximately 4400 MHz. In some systems, the first frequency band 230 may be dedicated exclusively to aircraft radio altimeters 210 (such that non-aircraft radio altimeter devices are unable to use the first frequency band 230), which may reduce an amount of interference at aircraft radio altimeters 210. For example, the UE 115-a and the network entity 105-a may be unable to use the first frequency band 230 for wireless communications, and may instead use a second frequency band 235 for wireless communications via a connection 240. The second frequency band 235 may be an example of a C-band (to which 5G communications may extend in some systems) and may span a frequency range between approximately 3700 MHz and approximately 3980 MHz. As such, there may be a frequency guard band, such as an approximately 220 MHz guard band, between an upper limit frequency channel of the second frequency band 235 (which may be referred to as an extreme C-band channel) and the first frequency band 230 (which may be referred to as an aircraft radio altimeter band).

In some scenarios, however, interference between wireless communications sent via the second frequency band 235 and signaling from the aircraft radio altimeter 210 may occur despite the approximately 220 MHz guard band. The interference may arise from one or more of various factors, including from structural or transmission characteristics of the network entity 105-a, transmission characteristics of the UE 115-a, or reception characteristics of the aircraft radio altimeter 210. For example, the network entity 105-a may be associated with a down tilt 245 (of one or more antenna panels) from horizontal, a mast height (of the one or more antenna panels), a lateral (such as by the ground) distance between the network entity 105-a and the aircraft 205, a vertical scan angle (within which the network entity 105-a may beamform communications to one or more UEs 115), and an antenna main beam (such as a primary or strongest transmission direction, and any one or more of such structural characteristics may result in relatively more or less interference at the aircraft radio altimeter 210.

In such examples, less of a down tilt 245, a higher mast height, a smaller lateral distance, a larger vertical scan angle, or an antenna main beam pointed relatively closer to the aircraft radio altimeter 210 may contribute to relatively higher levels of interference. A primary antenna beam of the UE 115-a may similarly contribute to higher levels of interference if pointed relatively closer to the aircraft radio altimeter 210. Further, a transmission power used by one or both of the UE 115-a or the network entity 105-a may contribute to interference. In some systems, the UE 115-a or the network entity 105-a, or both, may transmit using an emission level of approximately 77 dB (such as approximately 59 dBm/MHz) using the second frequency band 235, which may result in a spurious emission level of approximately −13 dBm/MHz in frequencies outside of the second frequency band 235 (such as frequencies that overlap with the first frequency band 230).

Further, a quality or capability of a receiver front-end (such as a receiver front-end filter response 250) of the aircraft radio altimeter 210 may influence how much interference the aircraft radio altimeter 210 measures or how well the aircraft radio altimeter 210 is able to filter out any measured interference, or both. In some aspects, aircraft radio altimeters 210 may be associated with relatively poor receiver front-end filter responses 250 (such that greater amounts of interference are measured or not filtered out, or both), such as due to a previous absence of wireless communications in any nearby frequency band. For example, a receiver front-end filter response 250 of the aircraft radio altimeter 210 may be associated with an approximately 24 dB or octave to an approximately 40 dB or octave roll-off below 4200 MHz and above 4400 MHz, where an approximately 24 dB or octave roll-off may translate to a relatively small amount of interference rejection 255 at the second frequency band 235 (the C-band). For example, an approximately 24 dB or octave roll-off may translate to an approximately 3 dB interference rejection 255 at the second frequency band 235. The receiver front-end filter response 250 of the aircraft radio altimeter 210 may be equivalently referred to as a radio altimeter receive mask.

The aircraft radio altimeter 210 may support one or more radar altimeter protection criteria, including a receiver front-end overload threshold, a receiver de-sensitization, or false altitude reports. The receiver front-end overload threshold may span approximately −53 dBm to approximately −40 dBm and, with a 77 dBm equivalent isotropically radiated power (EIRP) at the second frequency band 235, a lower bound of approximately 130 dBm of isolation may be sufficient (such that less than 130 dBm of isolation may be insufficient). The receiver desensitization may be approximately −102 dBm or approximately −117 dBm/MHz and, with approximately −13 dBm/MHz of C-band spurious emissions, a lower bound of approximately 104 dB of isolation may be sufficient (such that less than 104 dBm of isolation may be insufficient). Such a receiver desensitization may be relatively poor as compared to what may be used at the UE 115-a or the network entity 105-a, which may be due in part to manufacturing decisions made prior to deployment of wireless communications to the C-band. The false altitude reports may be approximately −103 dBm/MHz, which may be a relatively most relaxed of the radar altimeter protection criteria, and thus ignored in some deployment scenarios or analyses. In other words, because a receiver desensitization criterion is more stringent than a false altitude report criterion, the false altitude report criterion may be ignored in some deployment scenarios or analyses.

Due to the relatively poor receiver front-end filter response 250 of the aircraft radio altimeter 210 and other radar altimeter protection criteria, the aircraft radio altimeter 210 may still pick up energy from transmissions sent via the second frequency band 235, which may cause interference and adversely impact an ability or likelihood of the aircraft radio altimeter 210 to accurately measure the altitude 220 of the aircraft 205 to the ground level 225. However, a complete prohibition of wireless communications via the second frequency band may be unnecessary, as the UE 115-a and the network entity 105-a may employ interference avoidance techniques and because the UE 115-a and the network entity 105-a may not always be within a proximity to aircrafts 205. Further, while a "worst scenario" may include a 24 dB or octave roll-off and a −53 dBm overload threshold, it may be unlikely that a network load (such as a 5G network load) will reach 100% (where lower loads may result in less interference). Further, the UE 115-a and the network entity 105-a may employ MIMO (such as massive MIMO (M-MIMO)) communication and beamforming capabilities to reduce an amount of interference that transmissions performed using the second frequency band 235 contribute to the aircraft radio altimeter 210.

Accordingly, in some implementations, the UE 115-a and the network entity 105-a may employ one or more interference avoidance techniques associated with a usage of the second frequency band 235 to avoid causing interference to the aircraft radio altimeter 210. In accordance with an interference avoidance technique (which may be equivalently referred to as an interference avoidance scheme), one or both of the UE 115-a or the network entity 105-a may monitor the first frequency band 230 (such as the aircraft radio altimeter band) and may modify the connection 240 between the UE 115-a and the network entity 105-a if signaling from the aircraft radio altimeter 210 is measured or detected or if a presence (or likely presence) of the aircraft 205 is otherwise identified (such as via an implicit or explicit indication).

In some implementations, for example, the UE 115-a may perform radio altimeter monitoring 260 to measure or detect signaling from the aircraft radio altimeter 210. In such implementations, the UE 115-a may monitor the first frequency band 230 (while still, simultaneously or non-simultaneously, supporting wireless communications with the network entity 105-a via the second frequency band 235) and may detect signaling from the aircraft radio altimeter if a threshold amount of energy is received at the UE 115-a via the first frequency band 230. In some implementations, the UE 115-a may monitor the first frequency band 230 in accordance with (such as in response to) a triggering condition that triggers or indicates the UE 115-a to monitor the first frequency band 230. In scenarios in which the UE 115-a detects signaling from the aircraft radio altimeter 210, the UE 115-a, the UE 115-a may transmit, to the network entity 105-a, a request for the network entity 105-a to modify the connection 240 used for the communications sent via the second frequency band 235. Additional details relating to such triggering conditions and such a request for a modification of the connection 240 are illustrated by and described with reference to FIG. 3.

Additionally, or alternatively, the network entity 105-a may perform radio altimeter monitoring 265 to measure or detect signaling from the aircraft radio altimeter 210. In such implementations, the network entity 105-a may monitor the first frequency band 230 (while still, simultaneously or non-simultaneously, supporting wireless communications with the UE 115-a via the second frequency band 235) and may detect signaling from the aircraft radio altimeter if a threshold amount of energy is received at the network entity 105-a via the first frequency band 230. In some implementations, the network entity 105-a may monitor the first frequency band 230 in accordance with (such as due to) a geographic location of the network entity 105-a being within a geographic location associated with potential (such as likely) interference between the network entity 105-a and the aircraft radio altimeter 210. In scenarios in which the network entity 105-a detects signaling from the aircraft radio altimeter 210, the network entity 105-a may transmit, to the UE 115-a, an indication of a modification to the connection 240 used for the communications sent via the second frequency band 235. Additional details relating to such a modification of the connection 240 are illustrated by and described with reference to FIGS. 3 and 4.

Further, although generally described as performing communication via the second frequency band 235, the UE 115-a and the network entity 105-a may communicate via any subset of frequency resources within the second frequency band 235. Similarly, the aircraft radio altimeter 210 may transmit radar altimetry signaling via any subset of frequency resources within the first frequency band 230.

Further, communications or transmissions sent between the UE 115-*a* and the network entity 105-*a* via or using the second frequency band 235 may include one or more data messages, one or more control messages, one or more unicast messages, one or more broadcast messages, or any combination thereof. Further, although illustrated and described in the context of communication between the UE 115-*a* and the network entity 105-*a*, the techniques described herein may apply to deployments associated with one or multiple UEs 115 and one or more multiple network entities 105. For example, in scenarios in which the network entity 105-*a* serves multiple UEs 115, the network entity 105-*a* may modify a first connection between the network entity 105-*a* and a first UE 115 if aircraft radio altimeter signaling is detected in a first direction of the first UE 115 and may refrain from monitoring a second connection between the network entity 105-*a* and a second UE 115 if aircraft radio altimeter signaling is not detected in a second direction of the second UE 115.

Figure 3:
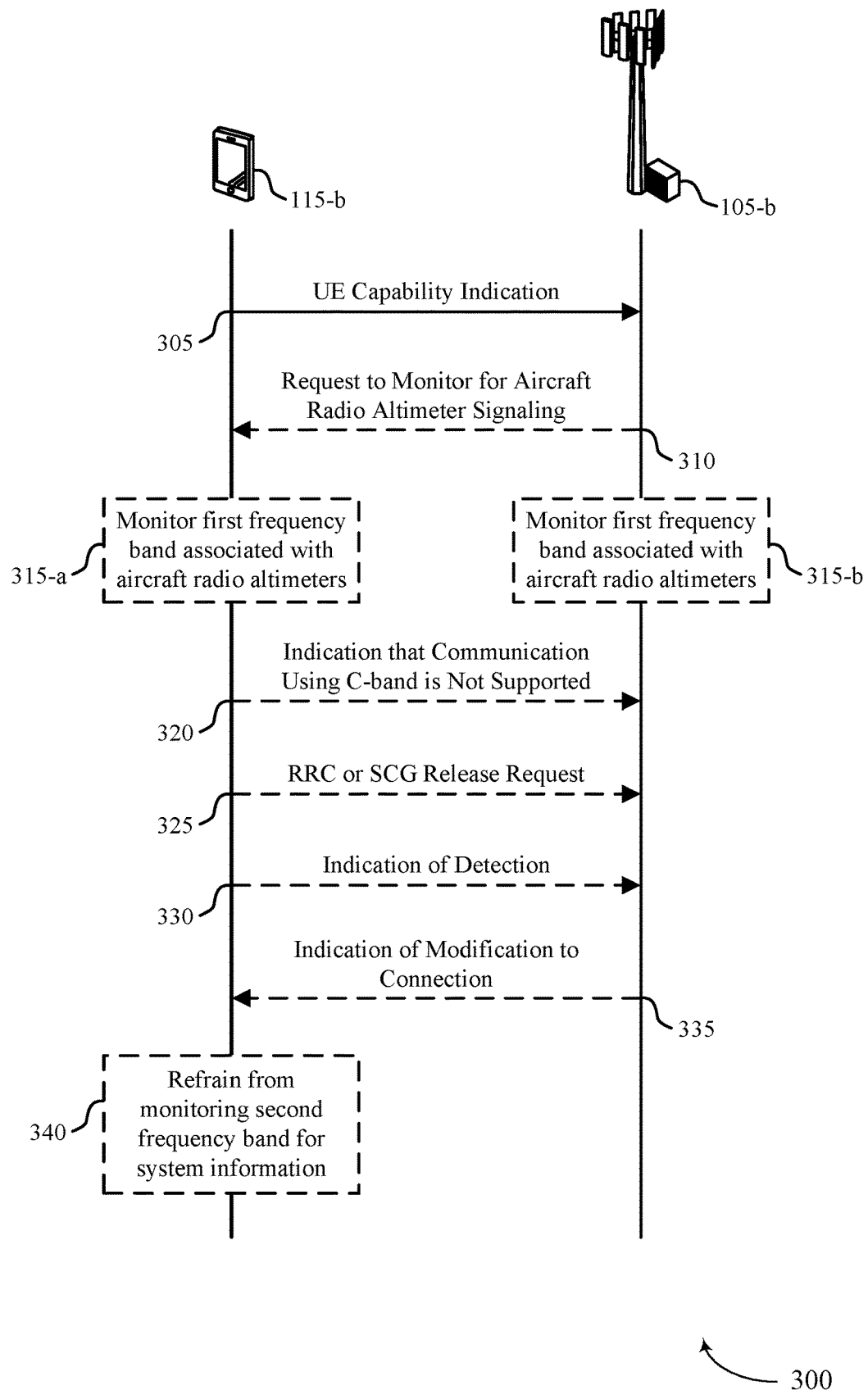
FIGS. 3 and 4 show example process flows that support interference mitigation techniques between wireless communications and aircraft radio altimeters.

FIG. 3 shows an example process flow 300 that supports interference mitigation techniques between wireless communications and aircraft radio altimeters. The process flow 300 may implement or be implemented to realize or supplement aspects of the wireless communications system 100 or the signaling diagram 200. For example, the process flow 300 illustrates communication between a UE 115-*b* and a network entity 105-*b*. The UE 115-*b* may be an example of a UE 115 or a UE 115-*a* as illustrated by and described with reference to FIGS. 1 and 2. The network entity 105-*b* may be an example of a network entity 105 or a network entity 105-*a* as illustrated by and described with reference to FIGS. 1 and 2. In some implementations, the UE 115-*b* and the network entity 105-*b* may support a UE capability reporting mechanism according to which the UE 115-*b* may monitor a first frequency band 230 for signaling from an aircraft radio altimeter 210.

In the following description of the process flow 300, the operations may be performed (such as reported or provided) in a different order than the order shown, or the operations performed by the example devices may be performed in different orders or at different times. For example, specific operations also may be left out of the process flow 300, or other operations may be added to the process flow 300. Further, although some operations or signaling may be shown to occur at different times for discussion purposes, these operations may actually occur at the same time. Further, the signaling illustrated by and described with reference to FIG. 3 may include one or more uplink control information (UCI) messages, one or more downlink control information (DCI) messages, RRC signaling, one or more MAC control elements (MAC-CEs), or one or more data messages, or any combination thereof.

At 305, the UE 115-*b* may transmit, to the network entity 105-*b*, a UE capability indication associated with aircraft radio altimetry at the first frequency band 230. Such a UE capability indication associated with aircraft radio altimetry at the first frequency band 230 may be an indication of a capability of the UE 115-*b* to monitor the first frequency band 230 associated with aircraft radio altimeters. For example, the UE 115-*b* may support a capability to monitor the first frequency band 230 (to detect or measure whether signaling from an aircraft radio altimeter 210 is present) and may transmit an indication of that capability to the network entity 105-*b*. In other words, the UE 115-*b* may have a capability to search for and detect aircraft radio altimeters 210.

At 310, the network entity 105-*b* may transmit, to the UE 115-*b*, a request to monitor for signaling associated with an aircraft radio altimeter 210. In some implementations, the request for the UE 115-*b* to monitor for signaling associated with an aircraft radio altimeter 210 may be in accordance with (such as in response to) the reported capability of the UE 115-*b*. In some implementations, the request may explicitly or implicitly indicate that the UE 115-*b* is located within a geographic area associated with potential (such as likely) interference between the UE 115-*b* and one or more aircraft radio altimeters 210.

At 315-*a*, the UE 115-*b* may monitor the first frequency band 230 for signaling associated with an aircraft radio altimeter 210 in accordance with the capability of the UE 115-*b*. In some implementations, the UE 115-*b* may monitor the first frequency band 230 in accordance with a triggering condition at the UE 115-*b*. In other words, if a triggering condition is satisfied, the UE 115-*b* may be triggered to begin monitoring the first frequency band 230. Such a trigger condition may include the reception of the request at 310 or one or more configuration-based trigger conditions.

In some implementations, for example, the UE 115-*b* may monitor the first frequency band 230 in accordance with an output of an artificial intelligence (AI) or machine learning (ML) algorithm (such as an AI or ML model) configured at the UE 115-*b*. In such implementations, the AI or ML algorithm may be associated with detecting whether the UE 115-*b* is within a geographic area associated with potential (such as likely) interference between the UE 115-*b* and one or more aircraft radio altimeters 210 and a triggering condition may be a specific output of the AI or ML algorithm. Additionally, or alternatively, the UE 115-*b* may monitor the first frequency band 230 in accordance with one or more other algorithms or applications running at the UE 115-*b*. For example, an algorithm, such as an AI or ML algorithm, may detect or expect a specific location of the UE 115-*b* in accordance with which applications are currently running at the UE 115-*b*. For example, the algorithm may detect that a routing or mapping application (such as a "maps" application) is running at the UE 115-*b* and that the UE 115-*b* is either located near an airport or other altimetry-critical area or is heading toward an airport or other altimetry-critical area (if a final destination in the "maps" application is an airport or a destination near an airport or other altimetry-critical area).

Additionally, or alternatively, the UE 115-*b* may monitor the first frequency band 230 in accordance with an establishment of a connection between the UE 115-*b* and an airport Wi-Fi network. For example, an establishment of the connection between the UE 115-*b* and the airport Wi-Fi network may indicate (implicitly or explicitly, such as via one or more session establishment messages) that the UE 115-*b* is located within a geographic area associated with potential (such as likely) interference between the UE 115-*b* and one or more aircraft radio altimeters 210. In such implementations, the triggering condition may be the establishment of the connection between the UE 115-*b* and the airport Wi-Fi network.

In scenarios in which the UE 115-*b* detects or measures signaling associated with an aircraft radio altimeter 210 or identifies that the UE 115-*b* is within a geographic location associated with potential (such as likely) interference between the UE 115-*b* and one or more aircraft radio altimeters 210, the UE 115-*b* may transmit, to the network entity 105-*b*, a request for a modification to a radio frequency connection between the UE 115-*b* and the network entity 105-*b* (such as a modification to a connection 240).

The request for the modification may take various forms in accordance with the implementations described herein. For example, the request for the modification may be an explicit request (such as via a connection suspend request, a request for handover, or a request for different communication resources) or an implicit request (such as via a report of measurement or monitoring results).

Additionally, or alternatively, at 315-*b*, the network entity 105-*b* may monitor the first frequency band 230 for signaling associated with an aircraft radio altimeter 210. In some implementations, the network entity 105-*b* may monitor the first frequency band 230 in accordance with (such as due to) a geographic location of the network entity 105-*b* being within a geographic area associated with potential (such as likely) interference between the network entity 105-*b* and one or more aircraft radio altimeters 210. In some implementations, the network entity 105-*b* may periodically search or monitor for radio altimeter signals using the first frequency band 230.

At 320, for example, the UE 115-*b* may transmit, to the network entity 105-*b*, an indication that communication via the second frequency band 235 is not supported in accordance with (such as due to) a detection of signaling associated with an aircraft radio altimeter 210. In other words, the UE 115-*b* may indicate that the C-band is not supported when the UE 115-*b* is detecting aircraft radio altimeters 210.

Additionally, or alternatively, at 325, the UE 115-*b* may transmit, to the network entity 105-*b*, one or both of an RRC release request or a secondary cell group (SCG) release request in accordance with a detection of signaling associated with an aircraft radio altimeter. For example, the UE 115-*b* may request the network entity 105-*b* to release the RRC connection between the UE 115-*b* and the network entity 105-*b* or transition the UE 115-*b* to an RRC idle state or an RRC inactive state, or both. Additionally, or alternatively, the UE 115-*b* may request the network entity 105-*b* to release the cell or cell group associated with the second frequency band 235. In some aspects, an SCG may be associated with the second frequency band 235 and, accordingly, the UE 115-*b* may request the network entity 105-*b* to release the UE 115-*b* from the SCG. In some implementations, the UE 115-*b* may include a reason or a cause (such as the cause for detection) for the RRC release request or the SCG release request (such as in the RRC release request or the SCG release request). In such implementations, the UE 115-*b* may indicate that a detection of signaling associated with an aircraft radio altimeter 210 or a detection of a threshold amount of energy via the first frequency band 230 is the reason or cause for the request. In some aspects, the RRC release request may be an example of a UE assistance information (UAI) RRC release request that the UE 115-*b* transmits when detecting aircraft radio altimeters 210.

Additionally, or alternatively, at 330, the UE 115-*b* may transmit, to the network entity 105-*b*, an indication of a detection of signaling associated with an aircraft radio altimeter 210. In such implementations, the indication of the detection of the signaling associated with the aircraft radio altimeter 210 may implicitly indicate the request for the modification to the radio frequency connection between the UE 115-*b* and the network entity 105-*b*. In some aspects, such an indication of the detection of the signaling associated with the aircraft radio altimeter may include aircraft radio altimetry monitoring results, which may function as an implicit request for modification or maintenance of the connection between the UE 115-*b* and the network entity 105-*b* depending on the results. For example, a first set of monitoring results (such as results including an energy measurement of less than a threshold energy measurement) may implicitly indicate that C-band communication between the UE 115-*b* and the network entity 105-*b* may continue and a second set of monitoring results (such as results including an energy measurement greater than or equal to a threshold energy measurement) may implicitly request a modification of C-band communication between the UE 115-*b* and the network entity 105-*b*.

At 335, the network entity 105-*b* may transmit, to the UE 115-*b*, an indication of a modification to the radio frequency connection between the UE 115-*b* and the network entity 105-*b*. The modification may include one or more updated cell selection or reselection parameters corresponding to the second frequency band 235, information associated with an updated directional configuration of the network entity 105-*b*, information associated with one or more updated handover parameters corresponding to the second frequency band 235, an indication of a handover of the UE 115-*b*, an indication of an RRC release, or an indication of an SCG release. Additional details relating such potential modifications to the radio frequency connection between the UE 115-*b* and the network entity 105-*b* are illustrated by and described with reference to FIG. 4.

At 340, the UE 115-*b* may refrain from monitoring the second frequency band 235 for system information in accordance with (such as due to) a detection of signaling associated with an aircraft radio altimeter 210. For example, the UE 115-*b* may refrain from camping on the second frequency band 235 as a result of detecting signaling associated with one or more aircraft radio altimeters 210. In other words, the UE 115-*b* may refrain from monitoring for one or more system information blocks (SIBs) on a serving cell associated with the second frequency band 235.

As such, the UE 115-*b* (such as a 5G UE) may support a capability for aircraft altimeter signal detection and reporting and may bus (such as use) radio altimeter signal detection results to one or more of a UE camping procedure, a UE band support capability report, or radio resource management (RRM), such as a measurement report with an indication of a detected aircraft radio altimeter signal for interference mitigation. Likewise, such implementations may enable the network entity 105-*b* (such as a 5G gNB) to prevent UE camping or serving on the second frequency band 235 (such as the C-band) when aircraft altimeter signals are detected.

Figure 4:
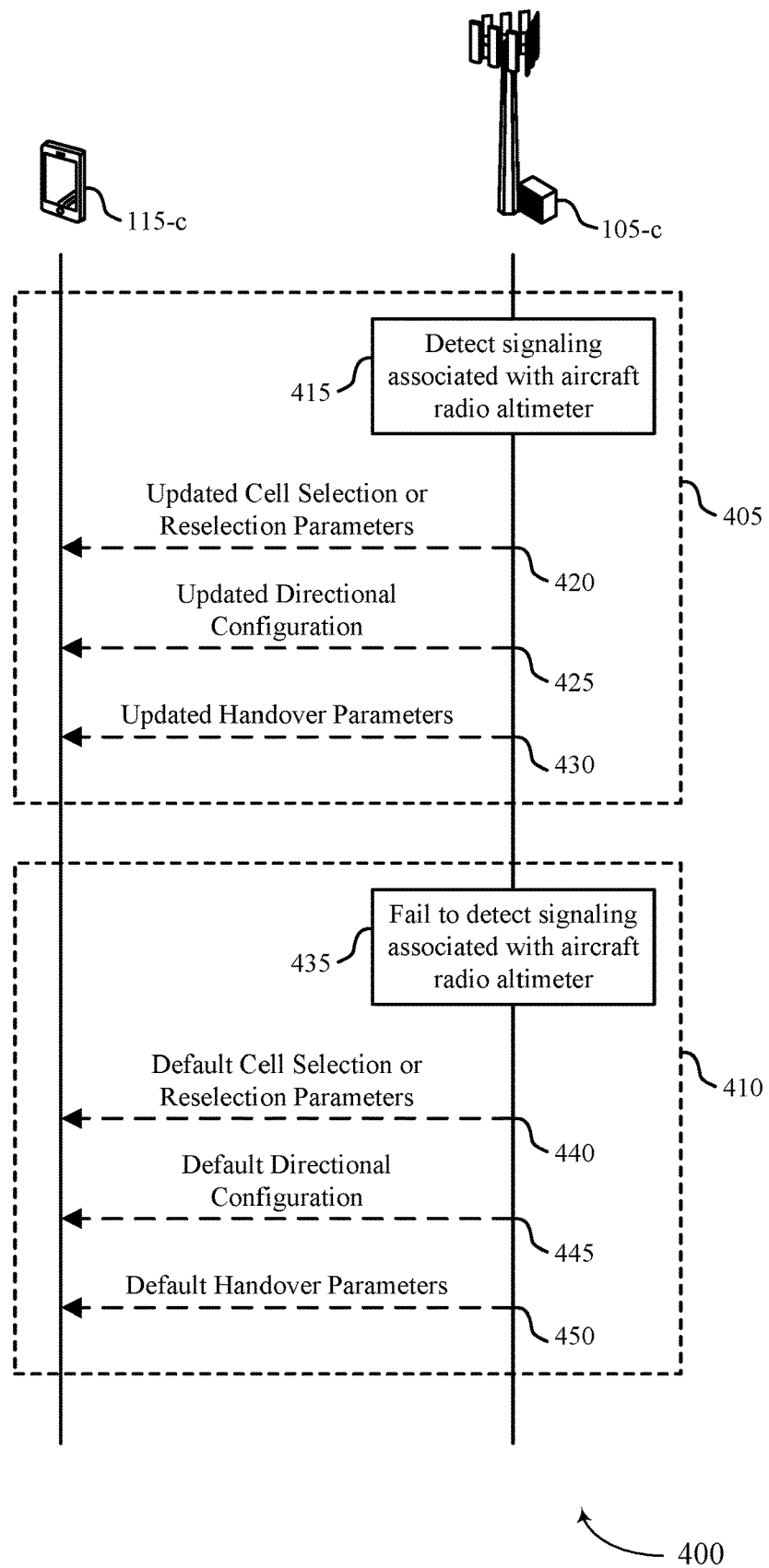

FIG. 4 shows an example process flow 400 that supports interference mitigation techniques between wireless communications and aircraft radio altimeters. The process flow 400 may implement or be implemented to realize or supplement aspects of the wireless communications system 100, the signaling diagram 200, or the process flow 300. For example, the process flow 400 illustrates communication between a UE 115-*c* and a network entity 105-*c*. The UE 115-*c* may be an example of a UE 115, a UE 115-*a*, or a UE 115-*b* as illustrated by and described with reference to FIGS. 1-3. The network entity 105-*c* may be an example of a network entity 105, a network entity 105-*a*, or a network entity 105-*b* as illustrated by and described with reference to FIGS. 1-3. In some implementations, the UE 115-*c* and the network entity 105-*c* may support a modification to a radio frequency connection between the UE 115-*c* and the network entity 105-*c* in accordance with (as a result of) detecting signaling associated with one or more aircraft radio altimeters 210.

In the following description of the process flow 400, the operations may be performed (such as reported or provided) in a different order than the order shown, or the operations performed by the example devices may be performed in different orders or at different times. For example, specific operations also may be left out of the process flow 400, or other operations may be added to the process flow 400. Further, although some operations or signaling may be shown to occur at different times for discussion purposes, these operations may actually occur at the same time. Further, the signaling illustrated by and described with reference to FIG. 4 may include one or more UCI messages, one or more DCI messages, RRC signaling, one or more MAC-CEs, or one or more data messages, or any combination thereof.

As illustrated by the process flow 400, the network entity 105-c may perform a first set of operations 405 in a first scenario in which the network entity 105-c detects signaling associated with an aircraft radio altimeter 210 or may perform a second set of operations 410 in a second scenario in which the network entity 105-c fails to detect signaling associated with an aircraft radio altimeter 210, or may perform both the first set of operations 405 and the second set of operations 410 (where the first set of operations 405 may occur before or after the second set of operations 410). For example, the network entity 105-c may either detect one or more aircraft radio altimeters 210 or may not detect one or more aircraft radio altimeters 210, or may detect one or more aircraft radio altimeters 210 at a first time domain occasion and may not detect one or more aircraft radio altimeters 210 at a second time domain occasion, and may perform one or both of the first set of operations 405 and the second set of operations 410 accordingly.

At 415, the network entity 105-c may detect signaling associated with an aircraft radio altimeter 210. In some implementations, the network entity 105-c may detect the signaling associated with the aircraft radio altimeter in accordance with monitoring the first frequency band 230, in accordance with receiving an indication of a detection at the UE 115-c, or in accordance with receiving a request from the UE 115-c to modify a radio frequency connection between the UE 115-c and the network entity 105-c. In accordance with detecting signaling associated with an aircraft radio altimeter 210, the network entity 105-c may transmit, to the UE 115-c, an indication of a modification to the radio frequency connection between the UE 115-c and the network entity 105-c.

At 420, for example, the network entity 105-c may transmit, to the UE 115-c, an indication of one or more updated cell selection or reselection parameters corresponding to the second frequency band 235. In some implementations, the one or more updated cell selection or reselection parameters may indicate at least one of an increased threshold signal strength (such as an increased Q_rxlvelmin value) relative to a previous threshold signal strength or an increased threshold signal quality (such as an increased Q_qualmin value) relative to a previous threshold signal quality, where a device (such as a UE 115), may only communicate via the second frequency band 235 if the device satisfies the increased threshold signal strength or the increased threshold signal quality.

In other words, if a radar altimeter signal is detected, the network entity 105-c may reduce the amount of UEs 115 that satisfy the increased threshold signal strength or the increased threshold signal quality and may not allow UEs 115 that fail to satisfy the increased threshold signal strength or the increased threshold signal quality to camp (such as monitor for SIBs) on a serving cell associated with the second frequency band 235. As such, the network entity 105-c may effectively limit the UEs 115 that are able to communicate using the second frequency band 235 to UEs 115 that are located relatively close to the network entity 105-c such that the devices that do use the second frequency band 235 are able to communicate using relatively lower transmit powers.

Additionally, or alternatively, at 425, the network entity 105-c may transmit, to the UE 115-c, information associated with an updated directional configuration of the network entity 105-c. In some implementations, the updated directional configuration may indicate a suspension of some directional signaling in directions oriented toward a direction of the detection of signaling associated with an aircraft radio altimeter 210. For example, the updated directional configuration may indicate at least one of a suspension of a subset of synchronization signal blocks (SSBs), a suspension of a subset of reference signal beam directions, or a suspension of a subset of data channel beam directions, where one or more of the subset of SSBs, the subset of reference signal beam directions, or the subset of data channel beam directions are oriented toward the direction of the detection of the signaling associated with an aircraft radio altimeter 210. Such data channel beam directions may refer to one or more physical downlink shared channel (PDSCH) beam directions. In some aspects, the network entity 105-c may leave on or turn on SSBs, reference signal beam directions, or data channel beam directions that are not oriented toward the direction of the signaling associated with an aircraft radio altimeter 210.

Additionally, or alternatively, at 430, the network entity 105-c may transmit, to the UE 115-c, information associated with one or more updated handover parameters corresponding to the second frequency band 235. In some implementations, the one or more updated handover parameters may restrict or prohibit UEs 115 from being handed over to a cell associated with the second frequency band 235. For example, the one or more updated handover parameters may indicate an increase handover threshold associated with the second frequency band 235 such that fewer (or zero) UEs 115 are allowed or able to handover to the second frequency band 235. Further, the one or more updated handover parameters may indicate a relatively higher time to trigger (TTT) value for devices not currently using the second frequency band 235 to reduce the likelihood of those devices being handed over to the second frequency band 235. In some implementations, the network entity 105-c may indicate a handover of the UE 115-c from a first cell associated with the second frequency band 235 to a third cell associated with a third frequency band (such as a non-C-band frequency band).

At 435, the network entity 105-c may fail to detect signaling associated with an aircraft radio altimeter 210. In some implementations, the network entity 105-c may fail to detect the signaling associated with the aircraft radio altimeter in accordance with monitoring the first frequency band 230, in accordance with failing to receive an indication of a detection at the UE 115-c, or in accordance with failing to receive a request from the UE 115-c to modify a radio frequency connection between the UE 115-c and the network entity 105-c. In accordance with failing to detect signaling associated with an aircraft radio altimeter 210, the network entity 105-c may refrain from modifying the radio frequency connection between the UE 115-c and the network entity 105-c, or may modify the radio frequency connection between the UE 115-c to return the radio frequency connection to a set of default parameters (such as to return to a set of default parameters after a time period of updated parameters that resulted from an earlier detection of aircraft radio altimeter signaling). In other words, if a radar altimeter signal is not detected, the network entity 105-c may perform a default (such as normal, or not modified as a result of a radar altimeter signal detection) layer management procedure.

At 440, for example, the network entity 105-c may transmit, to the UE 115-c, an indication of a default set of an indication of one or more default cell selection or reselection parameters corresponding to the second frequency band 235. In some implementations, such as in implementations in which the network entity 105-c is returning operation on the second frequency band 235 to default operation after a period of modified operation due to a radar altimeter signal detection, the one or more default cell selection or reselection parameters may indicate at least one of a reduced threshold signal strength (such as a reduced Q_rxlvelmin value) relative to a previous threshold signal strength or a reduced threshold signal quality (such as a reduced Q_qualmin value) relative to a previous threshold signal quality. As such, the network entity 105-c may allow UEs 115 to camp for SIBs on a cell associated with the second frequency band 235.

Additionally, or alternatively, at 445, the network entity 105-c may transmit, to the UE 115-c, information associated with a default directional configuration of the network entity 105-c. In some implementations, the default directional configuration may indicate a resumption of some directional signaling in directions oriented toward a direction of a previous detection of radar altimeter signaling. As such, the network entity 105-c may turn on SSBs, reference signal beam directions, or data channel beam directions that were previously turned off or suspended or that are not oriented toward a direction of signaling associated with an aircraft radio altimeter 210.

Additionally, or alternatively, at 450, the network entity 105-c may transmit, to the UE 115-c, information associated with one or more default handover parameters corresponding to the second frequency band 235. In some implementations, the one or more default handover parameters may enable UEs 115 to be handed over to a cell associated with the second frequency band 235. For example, the one or more default handover parameters may indicate a reduced handover threshold associated with the second frequency band 235 such that more UEs 115 are allowed or able to handover to the second frequency band 235. Further, the one or more default handover parameters may indicate a relatively lower TTT value for devices not currently using the second frequency band 235 to normalize (such as to return to a previous state prior modification responsive to a radar altimeter signal detection) the likelihood of those devices being handed over to the second frequency band 235. In some implementations, the network entity 105-c may indicate a handover of the UE 115-c from the third cell associated with the third frequency band to the first cell associated with second frequency band 235.

As such, the network entity 105-c (such as a 5G gNB) may support C-band 5G-NR interference to aircraft altimeter mitigation in accordance with modifying one or more radio frequency connections in response to either detecting or failing to detect signaling from an aircraft radio altimeter 210. Such implementations may enable the network entity 105-c to prevent UE camping or serving on the second frequency band 235 (such as the C-band) when aircraft altimeter signals are detected.

Figure 5:
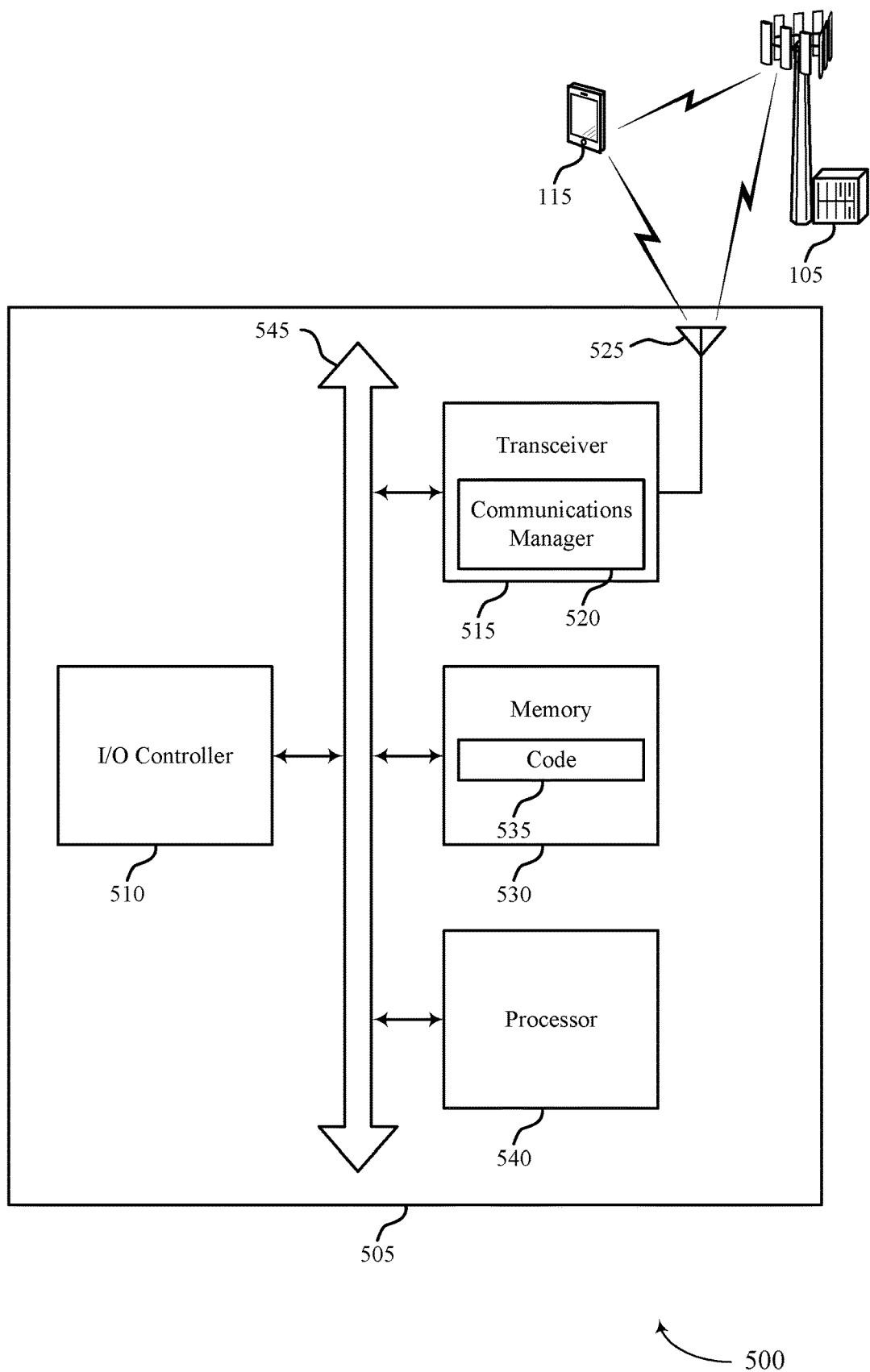
FIGS. 5 and 6 show block diagrams of example devices that support interference mitigation techniques between wireless communications and aircraft radio altimeters.

FIG. 5 shows a block diagram 500 of an example device 505 that supports interference mitigation techniques between wireless communications and aircraft radio altimeters. The device 505 may communicate (such as wirelessly) with one or more network entities (such as one or more components of one or more network entities 105), one or more UEs 115, or any combination thereof. The device 505 may include components for bi-directional voice and data communications including components for transmitting and receiving communications, such as a communications manager 520, an input/output (I/O) controller 510, a transceiver 515, an antenna 525, a memory 530, code 535, and a processor 540. These components may be in electronic communication or otherwise coupled (such as operatively, communicatively, functionally, electronically, electrically) via one or more buses (such as a bus 545).

The I/O controller 510 may manage input and output signals for the device 505. The I/O controller 510 also may manage peripherals not integrated into the device 505. In some implementations, the I/O controller 510 may represent a physical connection or port to an external peripheral. In some implementations, the I/O controller 510 may utilize an operating system such as iOS®, ANDROID®, MS-DOS®, MS-WINDOWS®, OS/2®, UNIX®, LINUX®, or another known operating system. Additionally, or alternatively, the I/O controller 510 may represent or interact with a modem, a keyboard, a mouse, a touchscreen, or a similar device. In some implementations, the I/O controller 510 may be implemented as part of a processor or processing system, such as the processor 540. In some implementations, a user may interact with the device 505 via the I/O controller 510 or via hardware components controlled by the I/O controller 510.

In some implementations, the device 505 may include a single antenna 525. However, in some other implementations, the device 505 may have more than one antenna 525, which may be capable of concurrently transmitting or receiving multiple wireless transmissions. The transceiver 515 may communicate bi-directionally, via the one or more antennas 525, wired, or wireless links as described herein. For example, the transceiver 515 may represent a wireless transceiver and may communicate bi-directionally with another wireless transceiver. The transceiver 515 also may include a modem to modulate the packets, to provide the modulated packets to one or more antennas 525 for transmission, and to demodulate packets received from the one or more antennas 525.

In some implementations, the transceiver 515 may include one or more interfaces, such as one or more interfaces coupled with the one or more antennas 525 that are configured to support various receiving or obtaining operations, or one or more interfaces coupled with the one or more antennas 525 that are configured to support various transmitting or outputting operations, or a combination thereof. In some implementations, the transceiver 515 may include or be configured for coupling with one or more processors or memory components that are operable to perform or support operations based on received or obtained information or signals, or to generate information or other signals for transmission or other outputting, or any combination thereof. In some implementations, the transceiver 515, or the transceiver 515 and the one or more antennas 525, or the transceiver 515 and the one or more antennas 525 and one or more processors or memory components (such as the processor 540, or the memory 530, or both), may be included in a chip or chip assembly that is installed in the device 505.

The memory 530 may include random access memory (RAM) and read-only memory (ROM). The memory 530 may store computer-readable, computer-executable code 535 including instructions that, when executed by the processor 540, cause the device 505 to perform various functions described herein. The code 535 may be stored in a non-transitory computer-readable medium such as system memory or another type of memory. In some implementations, the code 535 may not be directly executable by the processor 540 but may cause a computer (such as when compiled and executed) to perform functions described herein. In some implementations, the memory 530 may contain, among other things, a basic I/O system (BIOS) which may control basic hardware or software operation such as the interaction with peripheral components or devices.

The processor 540 may include an intelligent hardware device (such as a general-purpose processor, a digital signal processor (DSP), an application-specific integrated circuit (ASIC), a central processing unit (CPU), a field-programmable gate array (FPGA), a microcontroller, a programmable logic device, discrete gate or transistor logic, a discrete hardware component, or any combination thereof). In some implementations, the processor 540 may be configured to operate a memory array using a memory controller. In some other implementations, a memory controller may be integrated into the processor 540. The processor 540 may be configured to execute computer-readable instructions stored in a memory (such as the memory 530) to cause the device 505 to perform various functions (such as functions or tasks supporting interference mitigation techniques between wireless communications and aircraft radio altimeters). For example, the device 505 or a component of the device 505 may include a processor 540 and memory 530 coupled with the processor 540, the processor 540 and memory 530 configured to perform various functions described herein. The processor 540 may be an example of a cloud-computing platform (such as one or more physical nodes and supporting software such as operating systems, virtual machines, or container instances) that may host the functions (such as by executing code 535) to perform the functions of the device 505. The processor 540 may be any one or more suitable processors capable of executing scripts or instructions of one or more software programs stored in the device 505 (such as within the memory 530). In some implementations, the processor 540 may be a component of a processing system. A processing system may generally refer to a system or series of machines or components that receives inputs and processes the inputs to produce a set of outputs (which may be passed to other systems or components of, for example, the device 505). For example, a processing system of the device 505 may refer to a system including the various other components or subcomponents of the device 505, such as the processor 540, or the transceiver 515, or the communications manager 520, or other components or combinations of components of the device 505.

The processing system of the device 505 may interface with other components of the device 505, and may process information received from other components (such as inputs or signals) or output information to other components. For example, a chip or modem of the device 505 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 505 may transmit information output from the chip or modem. Additionally, or alternatively, in some implementations, the one or more interfaces may refer to an interface between the processing system of the chip or modem and a receiver, such that the device 505 may obtain information or signal inputs, and the information may be passed to the processing system. A person having ordinary skill in the art will readily recognize that a first interface also may obtain information or signal inputs, and a second interface also may output information or signal outputs.

The communications manager 520 may support wireless communication at a UE in accordance with examples as disclosed herein. For example, the communications manager 520 may be configured as or otherwise support a means for transmitting, to a network entity, a UE capability indication associated with aircraft radio altimetry at a first frequency band associated with aircraft radio altimeters. The communications manager 520 may be configured as or otherwise support a means for transmitting, to the network entity, a request for a modification to a radio frequency connection between the UE and the network entity, where the request for the modification is associated with the aircraft radio altimetry at the first frequency band, and where the radio frequency connection is associated with a second frequency band allocated for communications between the UE and the network entity.

In some implementations, to support monitoring the first frequency band, the communications manager 520 may be configured as or otherwise support a means for monitoring the first frequency band for signaling associated with an aircraft radio altimeter in accordance with the UE capability indication and in accordance with a triggering condition at the UE.

In some implementations, the communications manager 520 may be configured as or otherwise support a means for receiving, from the network entity, a request to monitor for the signaling associated with the aircraft radio altimeter in accordance with the UE capability indication, where the triggering condition is associated with the request to monitor for the signaling associated with the aircraft radio altimeter.

In some implementations, the request indicates that the UE is within a geographic area associated with potential interference between the UE and one or more aircraft radio altimeters.

In some implementations, the communications manager 520 may be configured as or otherwise support a means for selecting to monitor for the signaling associated with the aircraft radio altimeter in accordance with an output of an AI or ML algorithm at the UE, where the AI or ML algorithm is associated with detecting whether the UE is within a geographic area associated with potential interference between the UE and one or more aircraft radio altimeters, and where the triggering condition is associated with the output of the AI or ML algorithm.

In some implementations, the communications manager 520 may be configured as or otherwise support a means for selecting to monitor for the signaling associated with the aircraft radio altimeter in accordance with an establishment of a connection between the UE and an airport Wi-Fi network, where the establishment of the connection between the UE and the airport Wi-Fi network indicates that the UE is within a geographic area associated with potential interference between the UE and one or more aircraft radio altimeters, and where the triggering condition is associated with the establishment of the connection between the UE and the airport Wi-Fi network.

In some implementations, to support transmitting the request for the modification to the radio frequency connection, the communications manager 520 may be configured as or otherwise support a means for transmitting an indication that communication via the second frequency band is not supported in accordance with a detection of signaling associated with an aircraft radio altimeter.

In some implementations, to support transmitting the request for the modification to the radio frequency connection, the communications manager 520 may be configured as or otherwise support a means for transmitting an indication of a detection of signaling associated with an aircraft radio altimeter.

In some implementations, to support transmitting the request for the modification to the radio frequency connection, the communications manager 520 may be configured as or otherwise support a means for transmitting an RRC release request or an SCG release request in accordance with a detection of signaling associated with an aircraft radio altimeter.

In some implementations, the communications manager 520 may be configured as or otherwise support a means for receiving, from the network entity, one or more updated cell selection and reselection parameters corresponding to the second frequency band in accordance with the request for the modification to the radio frequency connection, where the modification to the radio frequency connection is associated with the one or more updated cell selection and reselection parameters.

In some implementations, the communications manager 520 may be configured as or otherwise support a means for receiving, from the network entity, information associated with an updated directional configuration of the network entity in accordance with a direction of a detection of signaling associated with an aircraft radio altimeter and in accordance with the request for the modification to the radio frequency connection, where the modification to the radio frequency connection is associated with the updated directional configuration of the network entity.

In some implementations, the communications manager 520 may be configured as or otherwise support a means for receiving, from the network entity, information associated with one or more updated handover parameters corresponding to the second frequency band in accordance with the request for the modification to the radio frequency connection, where the one or more updated handover parameters restricts the UE from being handed over to a cell associated with the second frequency band, and where the modification to the radio frequency connection is associated with the one or more updated handover parameters.

In some implementations, the communications manager 520 may be configured as or otherwise support a means for receiving, from the network entity, an indication of a handover from a first cell associated with the second frequency band to a second cell associated with a third frequency band in accordance with the request for the modification to the radio frequency connection between the UE and the network entity.

In some implementations, the communications manager 520 may be configured as or otherwise support a means for refraining from monitoring the second frequency band for system information in accordance with a detection of signaling associated with an aircraft radio altimeter.

In some implementations, the first frequency band is dedicated for aircraft radio altimeters. In some implementations, the second frequency band is within a C-band.

In some implementations, the communications manager 520 may be configured to perform various operations (such as receiving, monitoring, transmitting) using or otherwise in cooperation with the transceiver 515, the one or more antennas 525, or any combination thereof. Although the communications manager 520 is illustrated as a component of the transceiver 515, in some implementations, one or more functions described with reference to the communications manager 520 may be supported by or performed by the transceiver 515, the processor 540, the memory 530, the code 535, or any combination thereof. For example, the code 535 may include instructions executable by the processor 540 to cause the device 505 to perform various aspects of interference mitigation techniques between wireless communications and aircraft radio altimeters as described herein, or the processor 540 and the memory 530 may be otherwise configured to perform or support such operations.

Figure 6:
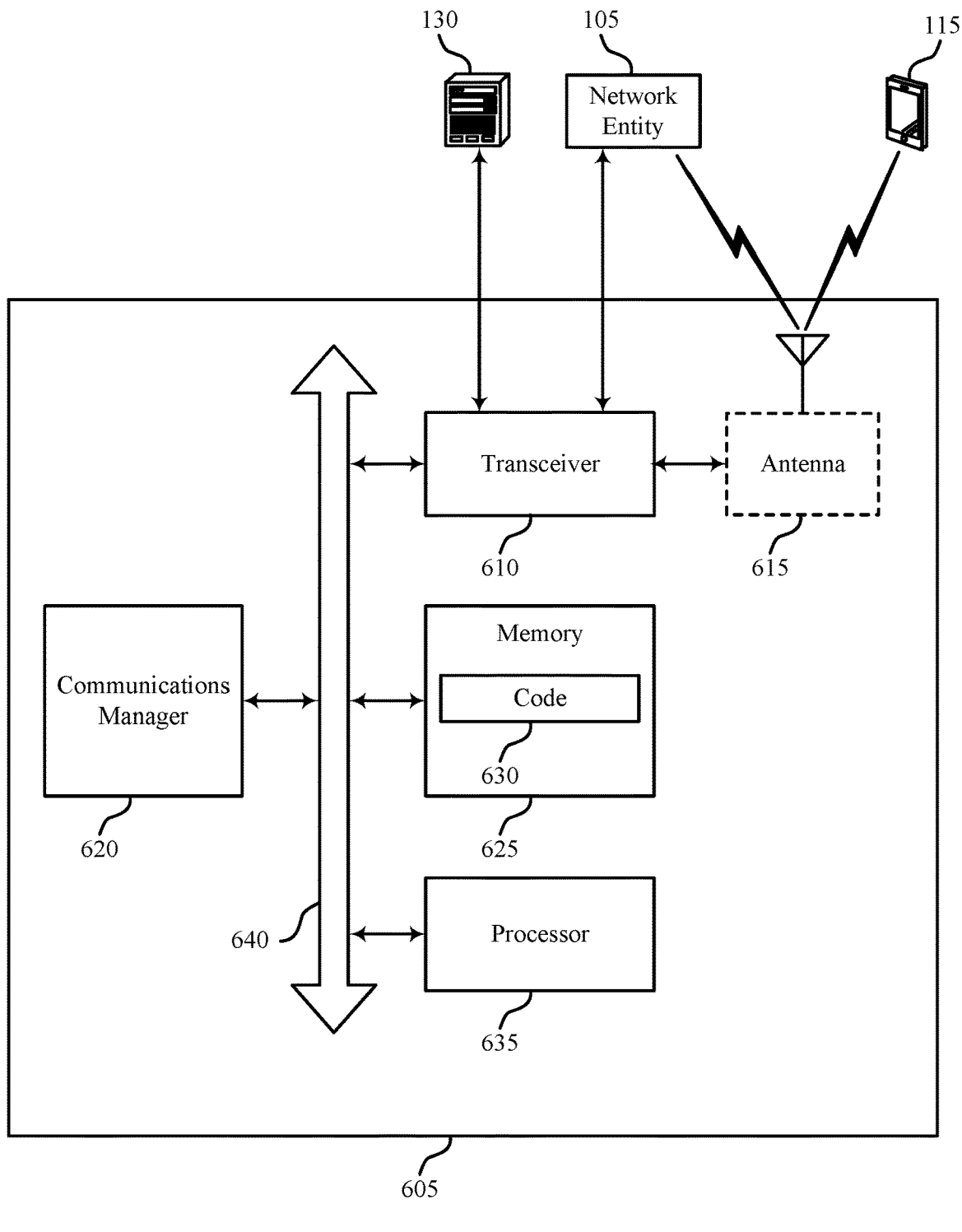

FIG. 6 shows a block diagram 600 of an example device 605 that supports interference mitigation techniques between wireless communications and aircraft radio altimeters. The device 605 may communicate with one or more network entities (such as one or more components of one or more network entities 105), one or more UEs 115, or any combination thereof, which may include communications over one or more wired interfaces, over one or more wireless interfaces, or any combination thereof. The device 605 may include components that support outputting and obtaining communications, such as a communications manager 620, a transceiver 610, an antenna 615, a memory 625, code 630, and a processor 635. These components may be in electronic communication or otherwise coupled (such as operatively, communicatively, functionally, electronically, electrically) via one or more buses (such as a bus 640).

The transceiver 610 may support bi-directional communications via wired links, wireless links, or both as described herein. In some implementations, the transceiver 610 may include a wired transceiver and may communicate bi-directionally with another wired transceiver. Additionally, or alternatively, in some examples, the transceiver 610 may include a wireless transceiver and may communicate bi-directionally with another wireless transceiver. In some implementations, the device 605 may include one or more antennas 615, which may be capable of transmitting or receiving wireless transmissions (such as concurrently). The transceiver 610 also may include a modem to modulate signals, to provide the modulated signals for transmission (such as by one or more antennas 615, by a wired transmitter), to receive modulated signals (such as from one or more antennas 615, from a wired receiver), and to demodulate signals. In some implementations, the transceiver 610 may include one or more interfaces, such as one or more interfaces coupled with the one or more antennas 615 that are configured to support various receiving or obtaining operations, or one or more interfaces coupled with the one or more antennas 615 that are configured to support various transmitting or outputting operations, or a combination thereof.

In some implementations, the transceiver 610 may include or be configured for coupling with one or more processors or memory components that are operable to perform or support operations based on received or obtained information or signals, or to generate information or other signals for transmission or other outputting, or any combination thereof. In some implementations, the transceiver 610, or the transceiver 610 and the one or more antennas 615, or the transceiver 610 and the one or more antennas 615 and one or more processors or memory components (such as the processor 635, or the memory 625, or both), may be included in a chip or chip assembly that is installed in the device 605. In some implementations, the transceiver may be operable to support communications via one or more communications links (such as a communication link 125, a backhaul communication link 120, a midhaul communication link 162, a fronthaul communication link 168).

The memory 625 may include RAM and ROM. The memory 625 may store computer-readable, computer-executable code 630 including instructions that, when executed by the processor 635, cause the device 605 to perform various functions described herein. The code 630 may be stored in a non-transitory computer-readable medium such as system memory or another type of memory. In some implementations, the code 630 may not be directly executable by the processor 635 but may cause a computer (such as when compiled and executed) to perform functions described herein. In some implementations, the memory 625 may contain, among other things, a BIOS which may control basic hardware or software operation such as the interaction with peripheral components or devices.

The processor 635 may include an intelligent hardware device (such as a general-purpose processor, a DSP, an ASIC, a CPU, an FPGA, a microcontroller, a programmable logic device, discrete gate or transistor logic, a discrete hardware component, or any combination thereof). In some implementations, the processor 635 may be configured to operate a memory array using a memory controller. In some other implementations, a memory controller may be integrated into the processor 635. The processor 635 may be configured to execute computer-readable instructions stored in a memory (such as the memory 625) to cause the device 605 to perform various functions (such as functions or tasks supporting interference mitigation techniques between wireless communications and aircraft radio altimeters). For example, the device 605 or a component of the device 605 may include a processor 635 and memory 625 coupled with the processor 635, the processor 635 and memory 625 configured to perform various functions described herein. The processor 635 may be an example of a cloud-computing platform (such as one or more physical nodes and supporting software such as operating systems, virtual machines, or container instances) that may host the functions (such as by executing code 630) to perform the functions of the device 605. The processor 635 may be any one or more suitable processors capable of executing scripts or instructions of one or more software programs stored in the device 605 (such as within the memory 625). In some implementations, the processor 635 may be a component of a processing system. A processing system may generally refer to a system or series of machines or components that receives inputs and processes the inputs to produce a set of outputs (which may be passed to other systems or components of, for example, the device 605). For example, a processing system of the device 605 may refer to a system including the various other components or subcomponents of the device 605, such as the processor 635, or the transceiver 610, or the communications manager 620, or other components or combinations of components of the device 605.

The processing system of the device 605 may interface with other components of the device 605, and may process information received from other components (such as inputs or signals) or output information to other components. For example, a chip or modem of the device 605 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 605 may transmit information output from the chip or modem. Additionally, or alternatively, in some implementations, the one or more interfaces may refer to an interface between the processing system of the chip or modem and a receiver, such that the device 605 may obtain information or signal inputs, and the information may be passed to the processing system. A person having ordinary skill in the art will readily recognize that a first interface also may obtain information or signal inputs, and a second interface also may output information or signal outputs.

In some implementations, a bus 640 may support communications of (such as within) a protocol layer of a protocol stack. In some implementations, a bus 640 may support communications associated with a logical channel of a protocol stack (such as between protocol layers of a protocol stack), which may include communications performed within a component of the device 605, or between different components of the device 605 that may be co-located or located in different locations (such as where the device 605 may refer to a system in which one or more of the communications manager 620, the transceiver 610, the memory 625, the code 630, and the processor 635 may be located in one of the different components or divided between different components).

In some implementations, the communications manager 620 may manage aspects of communications with a core network 130 (such as via one or more wired or wireless backhaul links). For example, the communications manager 620 may manage the transfer of data communications for client devices, such as one or more UEs 115. In some implementations, the communications manager 620 may manage communications with other network entities 105, and may include a controller or scheduler for controlling communications with UEs 115 in cooperation with other network entities 105. In some implementations, the communications manager 620 may support an X2 interface within an LTE/LTE-A wireless communications network technology to provide communication between network entities 105.

The communications manager 620 may support wireless communication at a network entity in accordance with examples as disclosed herein. For example, the communications manager 620 may be configured as or otherwise support a means for monitoring a first frequency band associated with aircraft radio altimeters in accordance with a geographic location of the network entity being within a geographic area associated with potential interference between the network entity and the aircraft radio altimeters. The communications manager 620 may be configured as or otherwise support a means for transmitting, to a UE, an indication of a modification to a radio frequency connection between the UE and the network entity in accordance with monitoring the first frequency band associated with the aircraft radio altimeters, where the radio frequency connection is associated with a second frequency band allocated for communications between the UE and the network entity.

In some implementations, to support transmitting the indication of the modification to the radio frequency connection, the communications manager 620 may be configured as or otherwise support a means for transmitting information associated with one or more updated cell selection and reselection parameters corresponding to the second frequency band, where the modification to the radio frequency connection is associated with the one or more updated cell selection and reselection parameters.

In some implementations, the one or more updated cell selection and reselection parameters indicate at least one of an increased threshold signal strength relative to a previous threshold signal strength or an increased threshold signal quality relative to a previous threshold signal quality.

In some implementations, to support transmitting the indication of the modification to the radio frequency connection, the communications manager 620 may be configured as or otherwise support a means for transmitting information associated with an updated directional configuration of the network entity in accordance with a direction of a detection of signaling associated with an aircraft radio altimeter, where the modification to the radio frequency connection is associated with the updated directional configuration of the network entity.

In some implementations, the updated directional configuration indicates at least one of a suspension of a subset of SSBs, a suspension of a subset of reference signal beam directions, or a suspension of a subset of data channel beam directions. In some implementations, the at least one of the subset of SSBs, the subset of reference signal beam directions, or the subset of data channel beam directions is oriented toward the direction of the detection of the signaling associated with the aircraft radio altimeter.

In some implementations, to support transmitting the indication of the modification to the radio frequency connection, the communications manager 620 may be configured as or otherwise support a means for transmitting information associated with one or more updated handover parameters corresponding to the second frequency band, where the one or more updated handover parameters restrict UEs from being handed over to a cell associated with the second frequency band, and where the modification to the radio frequency connection is associated with the one or more updated handover parameters.

In some implementations, to support transmitting the indication of the modification to the radio frequency connection, the communications manager 620 may be configured as or otherwise support a means for transmitting an indication of a handover from a first cell associated with the second frequency band to a second cell associated with a third frequency band in accordance with a detection of signaling associated with an aircraft radio altimeter.

In some implementations, the communications manager 620 may be configured as or otherwise support a means for receiving, from the UE, a UE capability indication associated with aircraft radio altimetry at the first frequency band associated with the aircraft radio altimeters. In some implementations, the communications manager 620 may be configured as or otherwise support a means for transmitting, to the UE, a request to monitor the first frequency band associated with the aircraft radio altimeters in accordance with the UE capability indication.

In some implementations, the communications manager 620 may be configured as or otherwise support a means for receiving, from the UE, an indication of a detection of signaling associated with an aircraft radio altimeter, where transmitting the indication of the modification to the radio frequency connection is associated with receiving the indication of the detection of the signaling associated with the aircraft radio altimeter from the UE.

In some implementations, the communications manager 620 may be configured as or otherwise support a means for receiving, from the UE, an RRC release request or an SCG release request in accordance with the detection of the signaling associated with the aircraft radio altimeter.

In some implementations, the first frequency band is dedicated for the aircraft radio altimeters. In some implementations, the second frequency band is within a C-band.

In some implementations, the communications manager 620 may be configured to perform various operations (such as receiving, obtaining, monitoring, outputting, transmitting) using or otherwise in cooperation with the transceiver 610, the one or more antennas 615 (such as where applicable), or any combination thereof. Although the communications manager 620 is illustrated as a separate component, in some examples, one or more functions described with reference to the communications manager 620 may be supported by or performed by the transceiver 610, the processor 635, the memory 625, the code 630, or any combination thereof. For example, the code 630 may include instructions executable by the processor 635 to cause the device 605 to perform various aspects of interference mitigation techniques between wireless communications and aircraft radio altimeters as described herein, or the processor 635 and the memory 625 may be otherwise configured to perform or support such operations.

Figure 7:
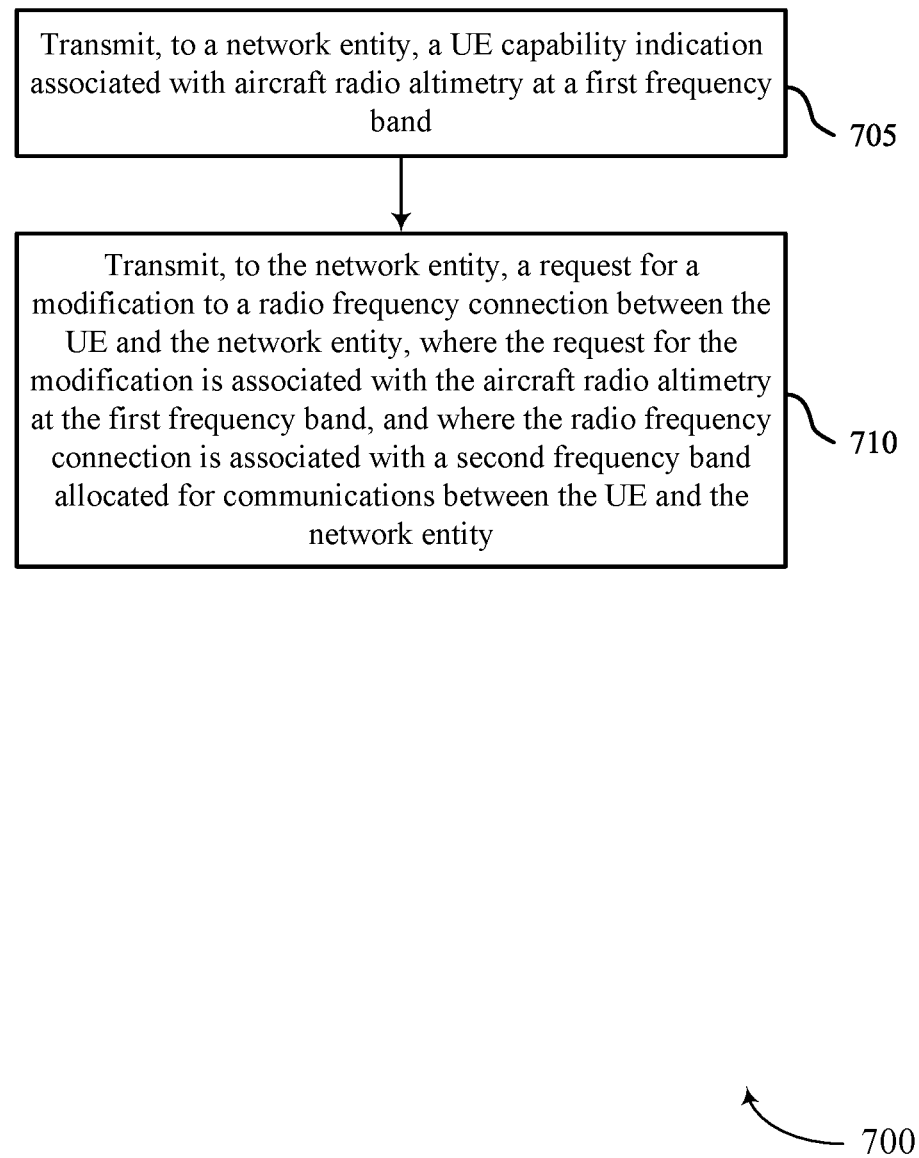
FIGS. 7 and 8 show flowcharts illustrating methods that support interference mitigation techniques between wireless communications and aircraft radio altimeters.

FIG. 7 shows a flowchart illustrating an example method 700 that supports interference mitigation techniques between wireless communications and aircraft radio altimeters. The operations of the method 700 may be implemented by a UE or its components as described herein. For example, the operations of the method 700 may be performed by a UE 115 as described with reference to FIGS. 1-5. In some implementations, a UE may execute a set of instructions to control the functional elements of the UE to perform the described functions. Additionally, or alternatively, the UE may perform aspects of the described functions using special-purpose hardware.

At 705, the method may include transmitting, to a network entity, a UE capability indication associated with aircraft radio altimetry at a first frequency band. The operations of 705 may be performed in accordance with examples as disclosed herein.

At 710, the method may include transmitting, to the network entity, a request for a modification to a radio frequency connection between the UE and the network entity, where the request for the modification is associated with the aircraft radio altimetry at the first frequency band, and where the radio frequency connection is associated with a second frequency band allocated for communications between the UE and the network entity. The operations of 710 may be performed in accordance with examples as disclosed herein.

Figure 8:
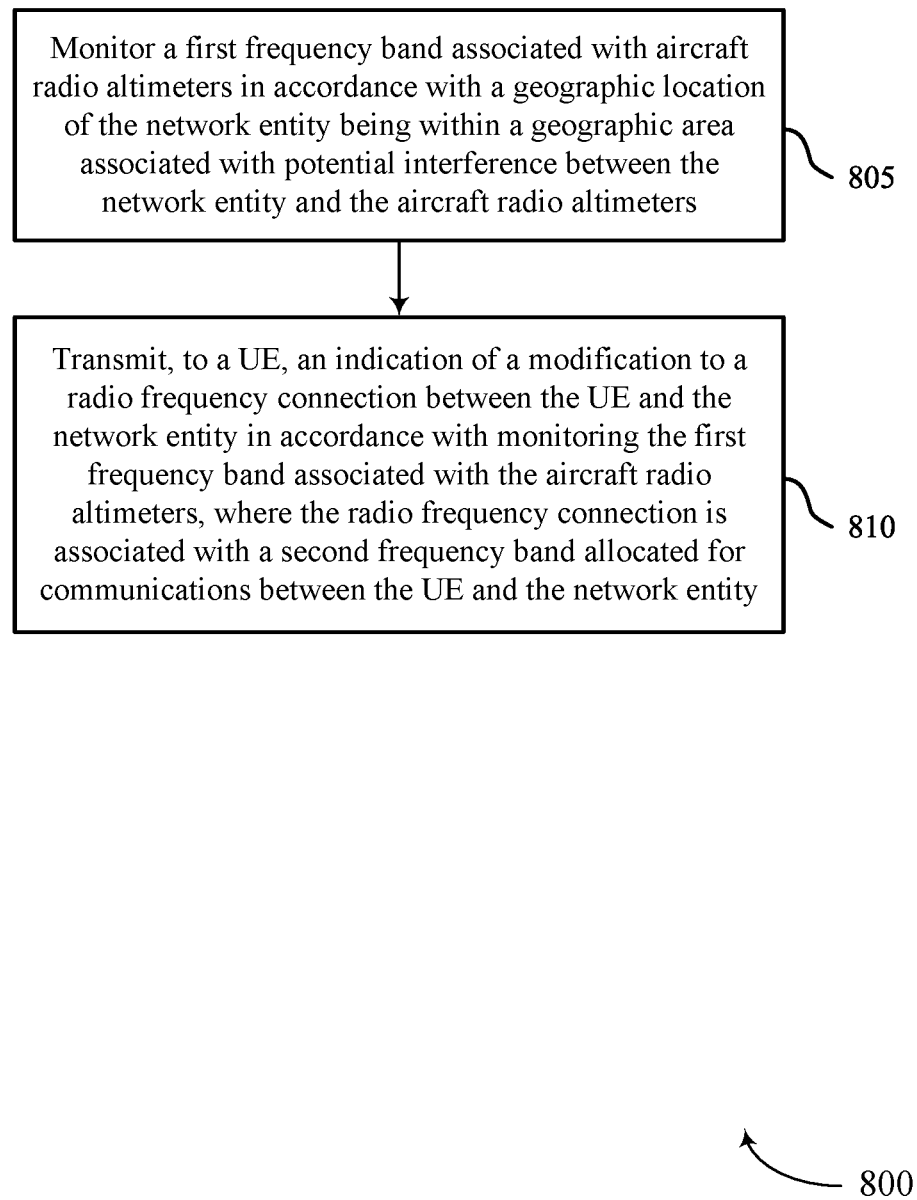

FIG. 8 shows a flowchart illustrating an example method 800 that supports interference mitigation techniques between wireless communications and aircraft radio altimeters. The operations of the method 800 may be implemented by a network entity or its components as described herein. For example, the operations of the method 800 may be performed by a network entity as described with reference to FIGS. 1-4 and 6. In some implementations, a network entity may execute a set of instructions to control the functional elements of the network entity to perform the described functions. Additionally, or alternatively, the network entity may perform aspects of the described functions using special-purpose hardware.

At 805, the method may include monitoring a first frequency band associated with aircraft radio altimeters in accordance with a geographic location of the network entity being within a geographic area associated with potential interference between the network entity and the aircraft radio altimeters. The operations of 805 may be performed in accordance with examples as disclosed herein.

At 810, the method may include transmitting, to a UE, an indication of a modification to a radio frequency connection between the UE and the network entity in accordance with monitoring the first frequency band associated with the aircraft radio altimeters, where the radio frequency connection is associated with a second frequency band allocated for communications between the UE and the network entity. The operations of 810 may be performed in accordance with examples as disclosed herein.

The following provides an overview of some aspects of the present disclosure:

Aspect 1: A method for wireless communication at a UE, including: transmitting, to a network entity, a UE capability indication associated with aircraft radio altimetry at a first frequency band; and transmitting, to the network entity, a request for a modification to a radio frequency connection between the UE and the network entity, where the request for the modification is associated with the aircraft radio altimetry at the first frequency band, and where the radio frequency connection is associated with a second frequency band allocated for communications between the UE and the network entity.

Aspect 2: The method of aspect 1, further including: monitoring the first frequency band for signaling associated with an aircraft radio altimeter in accordance with the UE capability indication and in accordance with a triggering condition at the UE.

Aspect 3: The method of aspect 2, further including: receiving, from the network entity, a request to monitor for the signaling associated with the aircraft radio altimeter in accordance with the UE capability indication, where the triggering condition is associated with the request to monitor for the signaling associated with the aircraft radio altimeter.

Aspect 4: The method of aspect 3, where the request indicates that the UE is within a geographic area associated with potential interference between the UE and one or more aircraft radio altimeters.

Aspect 5: The method of any of aspects 2-4, further including: selecting to monitor for the signaling associated with the aircraft radio altimeter in accordance with an output of an AI or ML algorithm at the UE, where the AI or ML algorithm is associated with detecting whether the UE is within a geographic area associated with potential interference between the UE and one or more aircraft radio altimeters, and where the triggering condition is associated with the output of the AI or ML algorithm.

Aspect 6: The method of any of aspects 2-5, further including: selecting to monitor for the signaling associated with the aircraft radio altimeter in accordance with an establishment of a connection between the UE and an airport Wi-Fi network, where the establishment of the connection between the UE and the airport Wi-Fi network indicates that the UE is within a geographic area associated with potential interference between the UE and one or more aircraft radio altimeters, and where the triggering condition is associated with the establishment of the connection between the UE and the airport Wi-Fi network.

Aspect 7: The method of any of aspects 1-6, where transmitting the request for the modification to the radio frequency connection includes: transmitting an indication that communication via the second frequency band is not supported in accordance with a detection of signaling associated with an aircraft radio altimeter.

Aspect 8: The method of any of aspects 1-7, where transmitting the request for the modification to the radio frequency connection includes: transmitting an indication of a detection of signaling associated with an aircraft radio altimeter.

Aspect 9: The method of any of aspects 1-8, where transmitting the request for the modification to the radio frequency connection includes: transmitting an RRC release request or an SCG release request in accordance with a detection of signaling associated with an aircraft radio altimeter.

Aspect 10: The method of any of aspects 1-9, further including: receiving, from the network entity, one or more updated cell selection and reselection parameters corresponding to the second frequency band in accordance with the request for the modification to the radio frequency connection, where the modification to the radio frequency connection is associated with the one or more updated cell selection and reselection parameters.

Aspect 11: The method of any of aspects 1-10, further including: receiving, from the network entity, information associated with an updated directional configuration of the network entity in accordance with a direction of a detection of signaling associated with an aircraft radio altimeter and in accordance with the request for the modification to the radio frequency connection, where the modification to the radio frequency connection is associated with the updated directional configuration of the network entity.

Aspect 12: The method of any of aspects 1-11, further including: receiving, from the network entity, information associated with one or more updated handover parameters corresponding to the second frequency band in accordance with the request for the modification to the radio frequency connection, where the one or more updated handover parameters restricts the UE from being handed over to a cell associated with the second frequency band, and where the modification to the radio frequency connection is associated with the one or more updated handover parameters.

Aspect 13: The method of any of aspects 1-12, further including: receiving, from the network entity, an indication of a handover from a first cell associated with the second frequency band to a second cell associated with a third frequency band in accordance with the request for the modification to the radio frequency connection between the UE and the network entity.

Aspect 14: The method of any of aspects 1-13, further including: refraining from monitoring the second frequency band for system information in accordance with a detection of signaling associated with an aircraft radio altimeter.

Aspect 15: The method of any of aspects 1-14, where the first frequency band is dedicated for aircraft radio altimeters, and the second frequency band is within a C-band.

Aspect 16: A method for wireless communication at a network entity, including: monitoring a first frequency band associated with aircraft radio altimeters in accordance with a geographic location of the network entity being within a geographic area associated with potential interference between the network entity and the aircraft radio altimeters; and transmitting, to a UE, an indication of a modification to a radio frequency connection between the UE and the network entity in accordance with monitoring the first frequency band associated with the aircraft radio altimeters, where the radio frequency connection is associated with a second frequency band allocated for communications between the UE and the network entity.

Aspect 17: The method of aspect 16, where transmitting the indication of the modification to the radio frequency connection includes: transmitting information associated with one or more updated cell selection and reselection parameters corresponding to the second frequency band, where the modification to the radio frequency connection is associated with the one or more updated cell selection and reselection parameters.

Aspect 18: The method of aspect 17, where the one or more updated cell selection and reselection parameters indicate at least one of an increased threshold signal strength relative to a previous threshold signal strength or an increased threshold signal quality relative to a previous threshold signal quality.

Aspect 19: The method of any of aspects 16-18, where transmitting the indication of the modification to the radio frequency connection includes: transmitting information associated with an updated directional configuration of the network entity in accordance with a direction of a detection of signaling associated with an aircraft radio altimeter, where the modification to the radio frequency connection is associated with the updated directional configuration of the network entity.

Aspect 20: The method of aspect 19, where the updated directional configuration indicates at least one of a suspension of a subset of SSBs, a suspension of a subset of reference signal beam directions, or a suspension of a subset of data channel beam directions, and the at least one of the subset of SSBs, the subset of reference signal beam directions, or the subset of data channel beam directions is oriented toward the direction of the detection of the signaling associated with the aircraft radio altimeter.

Aspect 21: The method of any of aspects 16-20, where transmitting the indication of the modification to the radio frequency connection includes: transmitting information associated with one or more updated handover parameters corresponding to the second frequency band, where the one or more updated handover parameters restrict UEs from being handed over to a cell associated with the second frequency band, and where the modification to the radio frequency connection is associated with the one or more updated handover parameters.

Aspect 22: The method of any of aspects 16-21, where transmitting the indication of the modification to the radio frequency connection includes: transmitting an indication of a handover from a first cell associated with the second frequency band to a second cell associated with a third frequency band in accordance with a detection of signaling associated with an aircraft radio altimeter.

Aspect 23: The method of any of aspects 16-22, further including: receiving, from the UE, a UE capability indication associated with aircraft radio altimetry at the first frequency band associated with the aircraft radio altimeters; and transmitting, to the UE, a request to monitor the first frequency band associated with the aircraft radio altimeters in accordance with the UE capability indication.

Aspect 24: The method of any of aspects 16-23, further including: receiving, from the UE, an indication of a detection of signaling associated with an aircraft radio altimeter, where transmitting the indication of the modification to the radio frequency connection is associated with receiving the indication of the detection of the signaling associated with the aircraft radio altimeter from the UE.

Aspect 25: The method of aspect 24, further including: receiving, from the UE, an RRC release request or an SCG release request in accordance with the detection of the signaling associated with the aircraft radio altimeter.

Aspect 26: The method of any of aspects 16-25, where the first frequency band is dedicated for the aircraft radio altimeters, and the second frequency band is within a C-band.

Aspect 27: An apparatus for wireless communication at a UE, including: one or more interfaces configured to: output, to a network entity, a UE capability indication associated with aircraft radio altimetry at a first frequency band; and output, to the network entity, a request for a modification to a radio frequency connection between the UE and the network entity, where the request for the modification is associated with the aircraft radio altimetry at the first frequency band, and where the radio frequency connection is associated with a second frequency band allocated for communications between the UE and the network entity.

Aspect 28: The apparatus of aspect 27, further including: a processing system configured to: monitor the first frequency band for signaling associated with an aircraft radio altimeter in accordance with the UE capability indication and in accordance with a triggering condition at the UE.

Aspect 29: The apparatus of aspect 28, where the one or more interfaces are further configured to: obtain, from the network entity, a request to monitor for the signaling associated with the aircraft radio altimeter in accordance with the UE capability indication, where the triggering condition is associated with the request to monitor for the signaling associated with the aircraft radio altimeter.

Aspect 30: The apparatus of aspect 29, where the request indicates that the UE is within a geographic area associated with potential interference between the UE and one or more aircraft radio altimeters.

Aspect 31: The apparatus of any of aspects 28-30, where the processing system is further configured to: select to monitor for the signaling associated with the aircraft radio altimeter in accordance with an output of an AI or ML algorithm at the UE, where the AI or ML algorithm is associated with detecting whether the UE is within a geographic area associated with potential interference between the UE and one or more aircraft radio altimeters, and where the triggering condition is associated with the output of the AI or ML algorithm.

Aspect 32: The apparatus of any of aspects 28-31, where the processing system is further configured to: select to monitor for the signaling associated with the aircraft radio altimeter in accordance with an establishment of a connection between the UE and an airport Wi-Fi network, where the establishment of the connection between the UE and the airport Wi-Fi network indicates that the UE is within a geographic area associated with potential interference between the UE and one or more aircraft radio altimeters, and where the triggering condition is associated with the establishment of the connection between the UE and the airport Wi-Fi network.

Aspect 33: The apparatus of any of aspects 27-32, where, to output the request for the modification to the radio frequency connection, the one or more interfaces are further configured to: output an indication that communication via the second frequency band is not supported in accordance with a detection of signaling associated with an aircraft radio altimeter.

Aspect 34: The apparatus of any of aspects 27-33, where, to output the request for the modification to the radio frequency connection, the one or more interfaces are further configured to: output an indication of a detection of signaling associated with an aircraft radio altimeter.

Aspect 35: The apparatus of any of aspects 27-34, where, to output the request for the modification to the radio frequency connection, the one or more interfaces are further configured to: output an RRC release request or an SCG release request in accordance with a detection of signaling associated with an aircraft radio altimeter.

Aspect 36: The apparatus of any of aspects 27-35, where the one or more interfaces are further configured to: obtain, from the network entity, one or more updated cell selection and reselection parameters corresponding to the second frequency band in accordance with the request for the modification to the radio frequency connection, where the modification to the radio frequency connection is associated with the one or more updated cell selection and reselection parameters.

Aspect 37: The apparatus of any of aspects 27-36, where the one or more interfaces are further configured to: obtain, from the network entity, information associated with an updated directional configuration of the network entity in accordance with a direction of a detection of signaling associated with an aircraft radio altimeter and in accordance with the request for the modification to the radio frequency connection, where the modification to the radio frequency connection is associated with the updated directional configuration of the network entity.

Aspect 38: The apparatus of any of aspects 27-37, where the one or more interfaces are further configured to: obtain, from the network entity, information associated with one or more updated handover parameters corresponding to the second frequency band in accordance with the request for the modification to the radio frequency connection, where the one or more updated handover parameters restricts the UE from being handed over to a cell associated with the second frequency band, and where the modification to the radio frequency connection is associated with the one or more updated handover parameters.

Aspect 39: The apparatus of any of aspects 27-38, where the one or more interfaces are further configured to: obtain, from the network entity, an indication of a handover from a first cell associated with the second frequency band to a second cell associated with a third frequency band in accordance with the request for the modification to the radio frequency connection between the UE and the network entity.

Aspect 40: The apparatus of any of aspects 27-39, where the one or more interfaces are further configured to: refrain from monitoring the second frequency band for system information in accordance with a detection of signaling associated with an aircraft radio altimeter.

Aspect 41: The apparatus of any of aspects 27-40, where the first frequency band is dedicated for aircraft radio altimeters, and the second frequency band is within a C-band.

Aspect 42: An apparatus for wireless communication at a network entity, including: a processing system configured to: monitor a first frequency band associated with aircraft radio altimeters in accordance with a geographic location of the network entity being within a geographic area associated with potential interference between the network entity and the aircraft radio altimeters; and one or more interfaces configured to: output, to a UE, an indication of a modification to a radio frequency connection between the UE and the network entity in accordance with monitoring the first frequency band associated with the aircraft radio altimeters, where the radio frequency connection is associated with a second frequency band allocated for communications between the UE and the network entity.

Aspect 43: The apparatus of aspect 42, where, to output the indication of the modification to the radio frequency connection, the one or more interfaces are further configured to: output information associated with one or more updated cell selection and reselection parameters corresponding to the second frequency band, where the modification to the radio frequency connection is associated with the one or more updated cell selection and reselection parameters.

Aspect 44: The apparatus of aspect 43, where the one or more updated cell selection and reselection parameters indicate at least one of an increased threshold signal strength relative to a previous threshold signal strength or an increased threshold signal quality relative to a previous threshold signal quality.

Aspect 45: The apparatus of any of aspects 42-44, where, to output the indication of the modification to the radio frequency connection, the one or more interfaces are further configured to: output information associated with an updated directional configuration of the network entity in accordance with a direction of a detection of signaling associated with an aircraft radio altimeter, where the modification to the radio frequency connection is associated with the updated directional configuration of the network entity.

Aspect 46: The apparatus of aspect 45, where the updated directional configuration indicates at least one of a suspension of a subset of SSBs, a suspension of a subset of reference signal beam directions, or a suspension of a subset of data channel beam directions, and the at least one of the subset of SSBs, the subset of reference signal beam directions, or the subset of data channel beam directions is oriented toward the direction of the detection of the signaling associated with the aircraft radio altimeter.

Aspect 47: The apparatus of any of aspects 42-46, where, to output the indication of the modification to the radio frequency connection, the one or more interfaces are further configured to: output information associated with one or more updated handover parameters corresponding to the second frequency band, where the one or more updated handover parameters restrict UEs from being handed over to a cell associated with the second frequency band, and where the modification to the radio frequency connection is associated with the one or more updated handover parameters.

Aspect 48: The apparatus of any of aspects 42-47, where, to output the indication of the modification to the radio frequency connection, the one or more interfaces are further configured to: output an indication of a handover from a first cell associated with the second frequency band to a second cell associated with a third frequency band in accordance with a detection of signaling associated with an aircraft radio altimeter.

Aspect 49: The apparatus of any of aspects 42-48, where the one or more interfaces are further configured to: obtain, from the UE, a UE capability indication associated with aircraft radio altimetry at the first frequency band associated with the aircraft radio altimeters; and output, to the UE, a request to monitor the first frequency band associated with the aircraft radio altimeters in accordance with the UE capability indication.

Aspect 50: The apparatus of any of aspects 42-49, where the one or more interfaces are further configured to: obtain, from the UE, an indication of a detection of signaling associated with an aircraft radio altimeter, where outputting the indication of the modification to the radio frequency connection is associated with obtaining the indication of the detection of the signaling associated with the aircraft radio altimeter from the UE.

Aspect 51: The apparatus of aspect 50, where the one or more interfaces are further configured to: obtain, from the UE, an RRC release request or an SCG release request in accordance with the detection of the signaling associated with the aircraft radio altimeter.

Aspect 52: The apparatus of any of aspects 42-51, where the first frequency band is dedicated for the aircraft radio altimeters, and the second frequency band is within a C-band.

Aspect 53: An apparatus for wireless communication at a UE, including: means for transmitting, to a network entity, a UE capability indication associated with aircraft radio altimetry at a first frequency band; and means for transmitting, to the network entity, a request for a modification to a radio frequency connection between the UE and the network entity, where the request for the modification is associated with the aircraft radio altimetry at the first frequency band, and where the radio frequency connection is associated with a second frequency band allocated for communications between the UE and the network entity.

Aspect 54: The apparatus of aspect 53, further including: means for monitoring the first frequency band for signaling associated with an aircraft radio altimeter in accordance with the UE capability indication and in accordance with a triggering condition at the UE.

Aspect 55: The apparatus of aspect 54, further including: means for receiving, from the network entity, a request to monitor for the signaling associated with the aircraft radio altimeter in accordance with the UE capability indication, where the triggering condition is associated with the request to monitor for the signaling associated with the aircraft radio altimeter.

Aspect 56: The apparatus of aspect 55, where the request indicates that the UE is within a geographic area associated with potential interference between the UE and one or more aircraft radio altimeters.

Aspect 57: The apparatus of any of aspects 54-56, further including: means for selecting to monitor for the signaling associated with the aircraft radio altimeter in accordance with an output of an AI or ML algorithm at the UE, where the AI or ML algorithm is associated with detecting whether the UE is within a geographic area associated with potential interference between the UE and one or more aircraft radio altimeters, and where the triggering condition is associated with the output of the AI or ML algorithm.

Aspect 58: The apparatus of any of aspects 54-57, further including: means for selecting to monitor for the signaling associated with the aircraft radio altimeter in accordance with an establishment of a connection between the UE and an airport Wi-Fi network, where the establishment of the connection between the UE and the airport Wi-Fi network indicates that the UE is within a geographic area associated with potential interference between the UE and one or more aircraft radio altimeters, and where the triggering condition is associated with the establishment of the connection between the UE and the airport Wi-Fi network.

Aspect 59: The apparatus of any of aspects 53-58, where the means for transmitting the request for the modification to the radio frequency connection include: means for transmitting an indication that communication via the second frequency band is not supported in accordance with a detection of signaling associated with an aircraft radio altimeter.

Aspect 60: The apparatus of any of aspects 53-59, where the means for transmitting the request for the modification to the radio frequency connection include: means for transmitting an indication of a detection of signaling associated with an aircraft radio altimeter.

Aspect 61: The apparatus of any of aspects 53-60, where the means for transmitting the request for the modification to the radio frequency connection include: means for transmitting an RRC release request or an SCG release request in accordance with a detection of signaling associated with an aircraft radio altimeter.

Aspect 62: The apparatus of any of aspects 53-61, further including: means for receiving, from the network entity, one or more updated cell selection and reselection parameters corresponding to the second frequency band in accordance with the request for the modification to the radio frequency connection, where the modification to the radio frequency connection is associated with the one or more updated cell selection and reselection parameters.

Aspect 63: The apparatus of any of aspects 53-62, further including: means for receiving, from the network entity, information associated with an updated directional configuration of the network entity in accordance with a direction of a detection of signaling associated with an aircraft radio altimeter and in accordance with the request for the modification to the radio frequency connection, where the modification to the radio frequency connection is associated with the updated directional configuration of the network entity.

Aspect 64: The apparatus of any of aspects 53-63, further including: means for receiving, from the network entity, information associated with one or more updated handover parameters corresponding to the second frequency band in accordance with the request for the modification to the radio frequency connection, where the one or more updated handover parameters restricts the UE from being handed over to a cell associated with the second frequency band, and where the modification to the radio frequency connection is associated with the one or more updated handover parameters.

Aspect 65: The apparatus of any of aspects 53-64, further including: means for receiving, from the network entity, an indication of a handover from a first cell associated with the second frequency band to a second cell associated with a third frequency band in accordance with the request for the modification to the radio frequency connection between the UE and the network entity.

Aspect 66: The apparatus of any of aspects 53-65, further including: means for refraining from monitoring the second frequency band for system information in accordance with a detection of signaling associated with an aircraft radio altimeter.

Aspect 67: The apparatus of any of aspects 53-66, where: the first frequency band is dedicated for aircraft radio altimeters, and the second frequency band is within a C-band.

Aspect 68: An apparatus for wireless communication at a network entity, including: means for monitoring a first frequency band associated with aircraft radio altimeters in accordance with a geographic location of the network entity being within a geographic area associated with potential interference between the network entity and the aircraft radio altimeters; and means for transmitting, to a UE, an indication of a modification to a radio frequency connection between the UE and the network entity in accordance with monitoring the first frequency band associated with the aircraft radio altimeters, where the radio frequency connection is associated with a second frequency band allocated for communications between the UE and the network entity.

Aspect 69: The apparatus of aspect 68, where the means for transmitting the indication of the modification to the radio frequency connection include: means for transmitting information associated with one or more updated cell selection and reselection parameters corresponding to the second frequency band, where the modification to the radio frequency connection is associated with the one or more updated cell selection and reselection parameters.

Aspect 70: The apparatus of aspect 69, where the one or more updated cell selection and reselection parameters indicate at least one of an increased threshold signal strength relative to a previous threshold signal strength or an increased threshold signal quality relative to a previous threshold signal quality.

Aspect 71: The apparatus of any of aspects 68-70, where the means for transmitting the indication of the modification to the radio frequency connection include: means for transmitting information associated with an updated directional configuration of the network entity in accordance with a direction of a detection of signaling associated with an aircraft radio altimeter, where the modification to the radio frequency connection is associated with the updated directional configuration of the network entity.

Aspect 72: The apparatus of aspect 71, where the updated directional configuration indicates at least one of a suspension of a subset of SSBs, a suspension of a subset of reference signal beam directions, or a suspension of a subset of data channel beam directions, and the at least one of the subset of SSBs, the subset of reference signal beam directions, or the subset of data channel beam directions is oriented toward the direction of the detection of the signaling associated with the aircraft radio altimeter.

Aspect 73: The apparatus of any of aspects 68-72, where the means for transmitting the indication of the modification to the radio frequency connection include: means for transmitting information associated with one or more updated handover parameters corresponding to the second frequency band, where the one or more updated handover parameters restrict UEs from being handed over to a cell associated with the second frequency band, and where the modification to the radio frequency connection is associated with the one or more updated handover parameters.

Aspect 74: The apparatus of any of aspects 68-73, where the means for transmitting the indication of the modification to the radio frequency connection include: means for transmitting an indication of a handover from a first cell associated with the second frequency band to a second cell associated with a third frequency band in accordance with a detection of signaling associated with an aircraft radio altimeter.

Aspect 75: The apparatus of any of aspects 68-74, further including: means for receiving, from the UE, a UE capability indication associated with aircraft radio altimetry at the first frequency band associated with the aircraft radio altimeters; and means for transmitting, to the UE, a request to monitor the first frequency band associated with the aircraft radio altimeters in accordance with the UE capability indication.

Aspect 76: The apparatus of any of aspects 68-75, further including: means for receiving, from the UE, an indication of a detection of signaling associated with an aircraft radio altimeter, where transmitting the indication of the modification to the radio frequency connection is associated with receiving the indication of the detection of the signaling associated with the aircraft radio altimeter from the UE.

Aspect 77: The apparatus of aspect 76, further including: means for receiving, from the UE, an RRC release request or an SCG release request in accordance with the detection of the signaling associated with the aircraft radio altimeter.

Aspect 78: The apparatus of any of aspects 68-77, where the first frequency band is dedicated for the aircraft radio altimeters, and the second frequency band is within a C-band.

Aspect 79: A non-transitory computer-readable medium storing code for wireless communication at a UE, the code including instructions executable by a processor to: transmit, to a network entity, a UE capability indication associated with aircraft radio altimetry at a first frequency band; and transmit, to the network entity, a request for a modification to a radio frequency connection between the UE and the network entity, where the request for the modification is associated with the aircraft radio altimetry at the first frequency band, and where the radio frequency connection is associated with a second frequency band allocated for communications between the UE and the network entity.

Aspect 80: The non-transitory computer-readable medium of aspect 79, where the instructions are further executable by the processor to: monitor the first frequency band for signaling associated with an aircraft radio altimeter in accordance with the UE capability indication and in accordance with a triggering condition at the UE.

Aspect 81: The non-transitory computer-readable medium of aspect 80, where the instructions are further executable by the processor to: receive, from the network entity, a request to monitor for the signaling associated with the aircraft radio altimeter in accordance with the UE capability indication, where the triggering condition is associated with the request to monitor for the signaling associated with the aircraft radio altimeter.

Aspect 82: The non-transitory computer-readable medium of aspect 81, where the request indicates that the UE is within a geographic area associated with potential interference between the UE and one or more aircraft radio altimeters.

Aspect 83: The non-transitory computer-readable medium of any of aspects 80-82, where the instructions are further executable by the processor to: select to monitor for the signaling associated with the aircraft radio altimeter in accordance with an output of an AI or ML algorithm at the UE, where the AI or ML algorithm is associated with detecting whether the UE is within a geographic area associated with potential interference between the UE and one or more aircraft radio altimeters, and where the triggering condition is associated with the output of the AI or ML algorithm.

Aspect 84: The non-transitory computer-readable medium of any of aspects 80-83, where the instructions are further executable by the processor to: select to monitor for the signaling associated with the aircraft radio altimeter in accordance with an establishment of a connection between the UE and an airport Wi-Fi network, where the establishment of the connection between the UE and the airport Wi-Fi network indicates that the UE is within a geographic area associated with potential interference between the UE and one or more aircraft radio altimeters, and where the triggering condition is associated with the establishment of the connection between the UE and the airport Wi-Fi network.

Aspect 85: The non-transitory computer-readable medium of any of aspects 79-84, where the instructions to transmit the request for the modification to the radio frequency connection are executable by the processor to: transmit an indication that communication via the second frequency band is not supported in accordance with a detection of signaling associated with an aircraft radio altimeter.

Aspect 86: The non-transitory computer-readable medium of any of aspects 79-85, where the instructions to transmit the request for the modification to the radio frequency connection are executable by the processor to: transmit an indication of a detection of signaling associated with an aircraft radio altimeter.

Aspect 87: The non-transitory computer-readable medium of any of aspects 79-86, where the instructions to transmit the request for the modification to the radio frequency connection are executable by the processor to: transmit an RRC release request or an SCG release request in accordance with a detection of signaling associated with an aircraft radio altimeter.

Aspect 88: The non-transitory computer-readable medium of any of aspects 79-87, where the instructions are further executable by the processor to: receive, from the network entity, one or more updated cell selection and reselection parameters corresponding to the second frequency band in accordance with the request for the modification to the radio frequency connection, where the modification to the radio frequency connection is associated with the one or more updated cell selection and reselection parameters.

Aspect 89: The non-transitory computer-readable medium of any of aspects 79-88, where the instructions are further executable by the processor to: receive, from the network entity, information associated with an updated directional configuration of the network entity in accordance with a direction of a detection of signaling associated with an aircraft radio altimeter and in accordance with the request for the modification to the radio frequency connection, where the modification to the radio frequency connection is associated with the updated directional configuration of the network entity.

Aspect 90: The non-transitory computer-readable medium of any of aspects 79-89, where the instructions are further executable by the processor to: receive, from the network entity, information associated with one or more updated handover parameters corresponding to the second frequency band in accordance with the request for the modification to the radio frequency connection, where the one or more updated handover parameters restricts the UE from being handed over to a cell associated with the second frequency band, and where the modification to the radio frequency connection is associated with the one or more updated handover parameters.

Aspect 91: The non-transitory computer-readable medium of any of aspects 79-90, where the instructions are further executable by the processor to: receive, from the network entity, an indication of a handover from a first cell associated with the second frequency band to a second cell associated with a third frequency band in accordance with the request for the modification to the radio frequency connection between the UE and the network entity.

Aspect 92: The non-transitory computer-readable medium of any of aspects 79-91, where the instructions are further executable by the processor to: refrain from monitoring the second frequency band for system information in accordance with a detection of signaling associated with an aircraft radio altimeter.

Aspect 93: The non-transitory computer-readable medium of any of aspects 79-92, where: the first frequency band is dedicated for aircraft radio altimeters, and the second frequency band is within a C-band.

Aspect 94: A non-transitory computer-readable medium storing code for wireless communication at a network entity, the code including instructions executable by a processor to: monitor a first frequency band associated with aircraft radio altimeters in accordance with a geographic location of the network entity being within a geographic area associated with potential interference between the network entity and the aircraft radio altimeters; and transmit, to a UE, an indication of a modification to a radio frequency connection between the UE and the network entity in accordance with monitoring the first frequency band associated with the aircraft radio altimeters, where the radio frequency connection is associated with a second frequency band allocated for communications between the UE and the network entity.

Aspect 95: The non-transitory computer-readable medium of aspect 94, where the instructions to transmit the indication of the modification to the radio frequency connection are executable by the processor to: transmit information associated with one or more updated cell selection and reselection parameters corresponding to the second frequency band, where the modification to the radio frequency connection is associated with the one or more updated cell selection and reselection parameters.

Aspect 96: The non-transitory computer-readable medium of aspect 95, where the one or more updated cell selection and reselection parameters indicate at least one of an increased threshold signal strength relative to a previous threshold signal strength or an increased threshold signal quality relative to a previous threshold signal quality.

Aspect 97: The non-transitory computer-readable medium of any of aspects 94-96, where the instructions to transmit the indication of the modification to the radio frequency connection are executable by the processor to: transmit information associated with an updated directional configuration of the network entity in accordance with a direction of a detection of signaling associated with an aircraft radio altimeter, where the modification to the radio frequency connection is associated with the updated directional configuration of the network entity.

Aspect 98: The non-transitory computer-readable medium of aspect 97, where the updated directional configuration indicates at least one of a suspension of a subset of SSBs, a suspension of a subset of reference signal beam directions, or a suspension of a subset of data channel beam directions, and the at least one of the subset of SSBs, the subset of reference signal beam directions, or the subset of data channel beam directions is oriented toward the direction of the detection of the signaling associated with the aircraft radio altimeter.

Aspect 99: The non-transitory computer-readable medium of any of aspects 94-98, where the instructions to transmit the indication of the modification to the radio frequency connection are executable by the processor to: transmit information associated with one or more updated handover parameters corresponding to the second frequency band, where the one or more updated handover parameters restrict UEs from being handed over to a cell associated with the second frequency band, and where the modification to the radio frequency connection is associated with the one or more updated handover parameters.

Aspect 100: The non-transitory computer-readable medium of any of aspects 94-99, where the instructions to transmit the indication of the modification to the radio frequency connection are executable by the processor to: transmit an indication of a handover from a first cell associated with the second frequency band to a second cell associated with a third frequency band in accordance with a detection of signaling associated with an aircraft radio altimeter.

Aspect 101: The non-transitory computer-readable medium of any of aspects 94-100, where the instructions are further executable by the processor to: receive, from the UE, a UE capability indication associated with aircraft radio altimetry at the first frequency band associated with the aircraft radio altimeters; and transmit, to the UE, a request to monitor the first frequency band associated with the aircraft radio altimeters in accordance with the UE capability indication.

Aspect 102: The non-transitory computer-readable medium of any of aspects 94-101, where the instructions are further executable by the processor to: receive, from the UE, an indication of a detection of signaling associated with an aircraft radio altimeter, where transmitting the indication of the modification to the radio frequency connection is associated with receiving the indication of the detection of the signaling associated with the aircraft radio altimeter from the UE.

Aspect 103: The non-transitory computer-readable medium of aspect 102, where the instructions are further executable by the processor to: receive, from the UE, an RRC release request or an SCG release request in accordance with the detection of the signaling associated with the aircraft radio altimeter.

Aspect 104: The non-transitory computer-readable medium of any of aspects 94-103, where the first frequency band is dedicated for the aircraft radio altimeters, and the second frequency band is within a C-band.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data stored in memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented using hardware or software depends upon the particular application and design constraints imposed on the overall system.

The hardware and data processing apparatus used to implement the various illustrative logics, logical blocks, modules and circuits described in connection with the aspects disclosed herein may be implemented or performed using a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented using hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted using one or more instructions or code of a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one location to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc. Disks may reproduce data magnetically and discs may reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communication at a user equipment (UE), comprising:
one or more interfaces configured to:
output, to a network entity, a UE capability indication associated with aircraft radio altimetry at a first frequency band;
output, to the network entity, a request for a modification to a radio frequency connection between the UE and the network entity, wherein the request for the modification is associated with the aircraft radio altimetry at the first frequency band, and wherein the radio frequency connection is associated with a second frequency band allocated for communications between the UE and the network entity; and
a processing system configured to:
monitor the first frequency band for signaling associated with an aircraft radio altimeter in accordance with the UE capability indication and in accordance with a triggering condition at the UE.

2. The apparatus of claim 1, wherein the one or more interfaces are further configured to:
obtain, from the network entity, a request to monitor for the signaling associated with the aircraft radio altimeter in accordance with the UE capability indication, wherein the triggering condition is associated with the request to monitor for the signaling associated with the aircraft radio altimeter.

3. The apparatus of claim 2, wherein the request indicates that the UE is within a geographic area associated with potential interference between the UE and one or more aircraft radio altimeters.

4. The apparatus of claim 1, wherein the processing system is further configured to:
select to monitor for the signaling associated with the aircraft radio altimeter in accordance with an output of an artificial intelligence (AI) or machine learning (ML) algorithm at the UE, wherein the AI or ML algorithm is associated with detecting whether the UE is within a geographic area associated with potential interference between the UE and one or more aircraft radio altimeters, and wherein the triggering condition is associated with the output of the AI or ML algorithm.

5. The apparatus of claim 1, wherein the processing system is further configured to:
select to monitor for the signaling associated with the aircraft radio altimeter in accordance with an establishment of a connection between the UE and an airport wireless fidelity (Wi-Fi) network, wherein the establishment of the connection between the UE and the airport Wi-Fi network indicates that the UE is within a geographic area associated with potential interference between the UE and one or more aircraft radio altimeters, and wherein the triggering condition is associated with the establishment of the connection between the UE and the airport Wi-Fi network.

6. The apparatus of claim 1, wherein, to output the request for the modification to the radio frequency connection, the one or more interfaces are further configured to:
output an indication that communication via the second frequency band is not supported in accordance with a detection of signaling associated with the aircraft radio altimeter.

7. The apparatus of claim 1, wherein, to output the request for the modification to the radio frequency connection, the one or more interfaces are further configured to:
output an indication of a detection of signaling associated with the aircraft radio altimeter.

8. The apparatus of claim 1, wherein, to output the request for the modification to the radio frequency connection, the one or more interfaces are further configured to:
output a radio resource control (RRC) release request or a secondary cell group (SCG) release request in accordance with a detection of signaling associated with the aircraft radio altimeter.

9. The apparatus of claim 1, wherein the one or more interfaces are further configured to:
obtain, from the network entity, one or more updated cell selection and reselection parameters corresponding to the second frequency band in accordance with the request for the modification to the radio frequency connection, wherein the modification to the radio frequency connection is associated with the one or more updated cell selection and reselection parameters.

10. An apparatus for wireless communication at a user equipment (UE), comprising:
one or more interfaces configured to:
output, to a network entity, a UE capability indication associated with aircraft radio altimetry at a first frequency band;
output, to the network entity, a request for a modification to a radio frequency connection between the UE and the network entity, wherein the request for the modification is associated with the aircraft radio altimetry at the first frequency band, and wherein the radio frequency connection is associated with a second frequency band allocated for communications between the UE and the network entity; and
obtain, from the network entity, information associated with an updated directional configuration of the network entity in accordance with a direction of a detection of signaling associated with an aircraft radio altimeter and in accordance with the request for the modification to the radio frequency connection, wherein the modification to the radio frequency connection is associated with the updated directional configuration of the network entity.

11. An apparatus for wireless communication at a user equipment (UE), comprising:
one or more interfaces configured to:
output, to a network entity, a UE capability indication associated with aircraft radio altimetry at a first frequency band;

output, to the network entity, a request for a modification to a radio frequency connection between the UE and the network entity, wherein the request for the modification is associated with the aircraft radio altimetry at the first frequency band, and wherein the radio frequency connection is associated with a second frequency band allocated for communications between the UE and the network entity; and obtain, from the network entity, information associated with one or more updated handover parameters corresponding to the second frequency band in accordance with the request for the modification to the radio frequency connection, wherein the one or more updated handover parameters restricts the UE from being handed over to a cell associated with the second frequency band, and wherein the modification to the radio frequency connection is associated with the one or more updated handover parameters.

12. The apparatus of claim 1, wherein the one or more interfaces are further configured to:
obtain, from the network entity, an indication of a handover from a first cell associated with the second frequency band to a second cell associated with a third frequency band in accordance with the request for the modification to the radio frequency connection between the UE and the network entity.

13. The apparatus of claim 1, wherein the one or more interfaces are further configured to:
refrain from monitoring the second frequency band for system information in accordance with a detection of signaling associated with the aircraft radio altimeter.

14. An apparatus for wireless communication at a network entity, comprising:
a processing system configured to:
monitor a first frequency band associated with aircraft radio altimeters in accordance with a geographic location of the network entity being within a geographic area associated with potential interference between the network entity and the aircraft radio altimeters; and
one or more interfaces configured to:
output, to a user equipment (UE), an indication of a modification to a radio frequency connection between the UE and the network entity in accordance with monitoring the first frequency band associated with the aircraft radio altimeters, wherein the radio frequency connection is associated with a second frequency band allocated for communications between the UE and the network entity; and
output information associated with an updated directional configuration of the network entity in accordance with a direction of a detection of signaling associated with an aircraft radio altimeter, wherein the modification to the radio frequency connection is associated with the updated directional configuration of the network entity.

15. The apparatus of claim 14, wherein, to output the indication of the modification to the radio frequency connection, the one or more interfaces are further configured to:
output information associated with one or more updated cell selection and reselection parameters corresponding to the second frequency band, wherein the modification to the radio frequency connection is associated with the one or more updated cell selection and reselection parameters.

16. The apparatus of claim 14, wherein the updated directional configuration indicates at least one of a suspension of a subset of synchronization signal blocks (SSBs), a suspension of a subset of reference signal beam directions, or a suspension of a subset of data channel beam directions, and wherein the at least one of the subset of SSBs, the subset of reference signal beam directions, or the subset of data channel beam directions is oriented toward the direction of the detection of the signaling associated with the aircraft radio altimeter.

17. An apparatus for wireless communication at a network entity, comprising:
a processing system configured to:
monitor a first frequency band associated with aircraft radio altimeters in accordance with a geographic location of the network entity being within a geographic area associated with potential interference between the network entity and the aircraft radio altimeters; and
one or more interfaces configured to:
output, to a user equipment (UE), an indication of a modification to a radio frequency connection between the UE and the network entity in accordance with monitoring the first frequency band associated with the aircraft radio altimeters, wherein the radio frequency connection is associated with a second frequency band allocated for communications between the UE and the network entity; and
output information associated with one or more updated handover parameters corresponding to the second frequency band, wherein the one or more updated handover parameters restrict UEs from being handed over to a cell associated with the second frequency band, and wherein the modification to the radio frequency connection is associated with the one or more updated handover parameters.

18. The apparatus of claim 14, wherein, to output the indication of the modification to the radio frequency connection, the one or more interfaces are further configured to:
output an indication of a handover from a first cell associated with the second frequency band to a second cell associated with a third frequency band in accordance with the detection of signaling associated with the aircraft radio altimeter.

19. A method for wireless communication at a user equipment (UE), comprising:
transmitting, to a network entity, a UE capability indication associated with aircraft radio altimetry at a first frequency band;
receiving, from the network entity, a request to monitor for the signaling associated with a aircraft radio altimeter in accordance with the UE capability indication, wherein a triggering condition is associated with the request to monitor for the signaling associated with the aircraft radio altimeter; and
transmitting, to the network entity, a request for a modification to a radio frequency connection between the UE and the network entity, wherein the request for the modification is associated with the aircraft radio altimetry at the first frequency band, and wherein the radio frequency connection is associated with a second frequency band allocated for communications between the UE and the network entity.

20. The method of claim 19, wherein transmitting the request for the modification to the radio frequency connection comprises:

transmitting an indication that communication via the second frequency band is not supported in accordance with a detection of signaling associated with the aircraft radio altimeter.

21. The method of claim 19, wherein transmitting the request for the modification to the radio frequency connection comprises:
   transmitting an indication of a detection of signaling associated with the aircraft radio altimeter.

22. The method of claim 19, wherein transmitting the request for the modification to the radio frequency connection comprises:
   transmitting a radio resource control (RRC) release request or a secondary cell group (SCG) release request in accordance with a detection of signaling associated with the aircraft radio altimeter.

23. A method for wireless communication at a network entity, comprising:
   monitoring a first frequency band associated with aircraft radio altimeters in accordance with a geographic location of the network entity being within a geographic area associated with potential interference between the network entity and the aircraft radio altimeters;
   transmitting, to a user equipment (UE), an indication of a modification to a radio frequency connection between the UE and the network entity in accordance with monitoring the first frequency band associated with the aircraft radio altimeters, wherein the radio frequency connection is associated with a second frequency band allocated for communications between the UE and the network entity; and
   transmitting, to the UE, information associated with an updated directional configuration of the network entity in accordance with a direction of a detection of signaling associated with an aircraft radio altimeter, wherein the modification to the radio frequency connection is associated with the updated directional configuration of the network entity.

24. The method of claim 23, wherein transmitting the indication of the modification to the radio frequency connection comprises:
   transmitting an indication of a handover from a first cell associated with the second frequency band to a second cell associated with a third frequency band in accordance with the detection of signaling associated with the aircraft radio altimeter.

25. The method of claim 23, further comprising:
   receiving, from the UE, a UE capability indication associated with aircraft radio altimetry at the first frequency band associated with the aircraft radio altimeters; and
   transmitting, to the UE, a request to monitor the first frequency band associated with the aircraft radio altimeters in accordance with the UE capability indication.

26. The method of claim 23, further comprising:
   receiving, from the UE, an indication of the detection of signaling associated with the aircraft radio altimeter, wherein transmitting the indication of the modification to the radio frequency connection is associated with receiving the indication of the detection of the signaling associated with the aircraft radio altimeter from the UE.

27. The method of claim 26, further comprising:
   receiving, from the UE, a radio resource control (RRC) release request or a secondary cell group (SCG) release request in accordance with the detection of the signaling associated with the aircraft radio altimeter.

* * * * *